US012802646B2

(12) United States Patent
Park et al.

(10) Patent No.: US 12,802,646 B2
(45) Date of Patent: Nov. 17, 2026

(54) DISPLAY DEVICE AND ELECTRONIC DEVICE USING THE SAME

(71) Applicant: Samsung Display Co., LTD., Yongin-si (KR)

(72) Inventors: Jun Hyun Park, Yongin-si (KR); Cheol Gon Lee, Yongin-si (KR); Jun Ki Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/083,086

(22) Filed: Mar. 18, 2025

(65) Prior Publication Data

US 2026/0004739 A1 Jan. 1, 2026

(30) Foreign Application Priority Data

Jun. 26, 2024 (KR) ........................ 10-2024-0083719
Nov. 4, 2024 (KR) ........................ 10-2024-0154659

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/043* (2013.01);
(Continued)

(58) Field of Classification Search
CPC .. G09G 3/3266; G09G 3/32; G09G 2300/043; G09G 2300/0819; G09G 2310/0267; G09G 2310/08; G09G 2330/021; G09G 2300/0426; G09G 2300/0842; G09G 2300/0861; G09G 2310/0251; G09G 2310/0262;
(Continued)

(56) References Cited

U.S. PATENT DOCUMENTS 10,276,094 B2 * 4/2019 Xiang ................ H10K 59/1216
10,529,283 B2 * 1/2020 Chai .................... G09G 3/3258
(Continued)

FOREIGN PATENT DOCUMENTS

KR 20220030416 A 3/2022
KR 102432801 B1 8/2022
KR 20230139915 A 10/2023

*Primary Examiner* — Michael J Jansen, II
(74) *Attorney, Agent, or Firm* — Womble Bond Dickinson (US) LLP

(57) ABSTRACT

A display device includes: a display panel in which pixels are arranged in a display area to display an image; and a gate driver configured to supply gate scan signals to the pixels on a horizontal line-by-horizontal line basis, wherein from among the pixels, pixels that are on a same horizontal line along each gate line are configured to initialize a gate electrode, a first electrode and a second electrode of a first transistor to an emission initialization voltage in response to a previous gate initialization signal supplied to pixels of a previous horizontal line and a current compensation gate signal from among the gate scan signals in a first period, to initialize the second electrode of the first transistor to an initialization voltage in response to a current gate initialization signal and the current compensation gate signal from among the gate scan signals in a second period.

18 Claims, 21 Drawing Sheets

(52) U.S. Cl.
CPC ............... *G09G 2300/0819* (2013.01); *G09G 2310/0267* (2013.01); *G09G 2310/08* (2013.01); *G09G 2330/021* (2013.01)

(58) Field of Classification Search
CPC ..... G09G 2320/0233; G09G 2320/043; G09G 2320/045; G09G 3/3233
See application file for complete search history.

(56) References Cited

U.S. PATENT DOCUMENTS

| | | | | |
|---|---|---|---|---|
| 10,872,570 | B2 * | 12/2020 | Kim | H10K 59/131 |
| 11,049,458 | B1 * | 6/2021 | Fan | G09G 3/3266 |
| 11,257,422 | B2 * | 2/2022 | Oh | G09G 3/32 |
| 11,295,662 | B2 * | 4/2022 | Jeon | G09G 3/32 |
| 11,423,834 | B2 * | 8/2022 | Park | G09G 3/3233 |
| 11,488,530 | B2 * | 11/2022 | Wang | G09G 3/3233 |
| 11,677,058 | B2 * | 6/2023 | Park | H10H 20/857<br>257/79 |
| 11,810,517 | B2 * | 11/2023 | Park | G09G 3/3241 |
| 11,996,046 | B2 * | 5/2024 | Kim | G09G 3/3233 |
| 12,046,199 | B2 * | 7/2024 | Cho | G09G 3/3233 |
| 12,067,913 | B2 * | 8/2024 | Park | G09G 3/3233 |
| 12,125,433 | B2 * | 10/2024 | Kim | G09G 3/32 |
| 12,198,627 | B2 * | 1/2025 | Kim | G09G 3/3275 |
| 12,200,990 | B2 * | 1/2025 | Tanaka | H10D 86/60 |
| 12,223,901 | B2 * | 2/2025 | Cho | G09G 3/3233 |
| 12,230,204 | B2 * | 2/2025 | Wang | G09G 3/3233 |
| 12,288,522 | B1 * | 4/2025 | Yang | G09G 3/3258 |
| 12,289,972 | B2 * | 4/2025 | Kim | H10K 59/131 |
| 12,300,177 | B2 * | 5/2025 | Zhang | G09G 3/3233 |
| 12,387,673 | B2 * | 8/2025 | Jeong | G09G 3/3233 |
| 12,408,524 | B2 * | 9/2025 | Choi | H10K 59/131 |
| 12,431,080 | B2 * | 9/2025 | Kim | G09G 3/3233 |
| 12,488,753 | B2 * | 12/2025 | Lai | G09G 3/3233 |
| 12,494,169 | B2 * | 12/2025 | Noh | G09G 3/3233 |
| 12,499,817 | B2 * | 12/2025 | Park | G09G 3/32 |
| 12,531,009 | B2 * | 1/2026 | Ha | G09G 3/32 |
| 12,614,521 | B2 * | 4/2026 | Gao | G09G 3/3258 |
| 12,658,135 | B2 * | 6/2026 | Yu | G09G 3/3233 |
| 2017/0270853 | A1 * | 9/2017 | Xiang | G09G 3/3233 |
| 2018/0158407 | A1 * | 6/2018 | Chai | G09G 3/3233 |
| 2019/0066598 | A1 * | 2/2019 | Kim | G09G 3/3291 |
| 2021/0201764 | A1 * | 7/2021 | Oh | G09G 3/3233 |
| 2021/0350740 | A1 | 11/2021 | Byun et al. | |
| 2021/0367122 | A1 * | 11/2021 | Park | H10H 20/857 |
| 2021/0375192 | A1 * | 12/2021 | Jeon | G09G 3/3233 |
| 2021/0407436 | A1 * | 12/2021 | Park | G09G 3/3233 |
| 2022/0157238 | A1 * | 5/2022 | Wang | G09G 3/3233 |
| 2022/0208088 | A1 * | 6/2022 | Kim | H10K 50/813 |
| 2022/0344445 | A1 * | 10/2022 | Tanaka | H10D 30/6745 |
| 2023/0032883 | A1 * | 2/2023 | Park | G09G 3/3241 |
| 2023/0090058 | A1 * | 3/2023 | Kim | H10K 59/131<br>257/211 |
| 2023/0178023 | A1 * | 6/2023 | Kim | H01L 25/167<br>345/690 |
| 2023/0284489 | A1 * | 9/2023 | Choi | G09G 3/03 |
| 2023/0317008 | A1 * | 10/2023 | Kim | G09G 3/3266 |
| 2023/0335056 | A1 * | 10/2023 | Cho | G09G 3/3266 |
| 2023/0335058 | A1 * | 10/2023 | Cho | G09G 3/3233 |
| 2024/0054927 | A1 * | 2/2024 | Park | G09G 3/006 |
| 2024/0054953 | A1 * | 2/2024 | Jeong | G09G 3/3233 |
| 2024/0062710 | A1 * | 2/2024 | Park | G09G 3/32 |
| 2024/0071305 | A1 * | 2/2024 | Kim | G09G 3/3275 |
| 2024/0121984 | A1 | 4/2024 | Kim et al. | |
| 2024/0144870 | A1 * | 5/2024 | Wang | G09G 3/3233 |
| 2024/0177672 | A1 * | 5/2024 | Zhang | G09G 3/3233 |
| 2024/0249667 | A1 * | 7/2024 | Ha | G09G 3/32 |
| 2024/0257739 | A1 * | 8/2024 | Noh | G09G 3/3233 |
| 2024/0321211 | A1 * | 9/2024 | Gao | G09G 3/3258 |
| 2024/0355289 | A1 * | 10/2024 | Lai | G09G 3/3233 |
| 2025/0069555 | A1 * | 2/2025 | Kim | G09G 3/3233 |
| 2025/0279056 | A1 * | 9/2025 | Yu | G09G 3/3233 |

* cited by examiner

DISPLAY DEVICE AND ELECTRONIC DEVICE USING THE SAME

CROSS-REFERENCE TO RELATED APPLICATIONS

The present application claims priority to and the benefit of Korean Patent Application No. 10-2024-0083719, filed on Jun. 26, 2024, and Korean Patent Application No. 10-2024-0154659, filed on Nov. 4, 2024, in the Korean Intellectual Property Office, the entire disclosures of which are incorporated herein in by reference.

BACKGROUND

1. Field

The present disclosure relates to a display device and an electronic device using the same.

2. Description of the Related Art

As the information society develops, demands for display devices for displaying images are increasing in various forms. For example, display devices are applied to various electronic devices such as smartphones, digital cameras, laptop computers, navigation devices, and smart televisions.

The display devices may be flat panel display devices such as liquid crystal display devices, field emission display devices, and organic light emitting display devices. Among these flat panel display devices, an organic light emitting display device includes a light emitting element, for example, an organic light emitting diode that causes the luminance of each pixel to vary according to electric current. Accordingly, the organic light emitting display device can display an image without a backlight unit that provides light to a display panel.

SUMMARY

Aspects and features of embodiments of the present disclosure provide a display device that improves the arrangement structure of transistors of each pixel so that a hysteresis improvement operation and an initialization voltage input operation of current pixels can be performed in response to an initialization gate signal of previous pixels and an electronic device using the display device.

Aspects and features of embodiments of the present disclosure also provide a display device that improves a dual or triple-gate formation structure of at least one of transistors in a pixel circuit of each pixel and improves a connection structure between nodes of the pixel circuit according to the dual or triple-gate structure and an electronic device using the display device.

However, aspects and features of embodiments of the present disclosure are not restricted to the one set forth herein. The above and other aspects of the present disclosure will become more apparent to one of ordinary skill in the art to which the present disclosure pertains by referencing the detailed description of the present disclosure given below.

According to one or more embodiments of the present disclosure, there is provided a display device including a display panel in which a plurality of pixels are arranged in a display area to display an image, and a gate driver configured to supply gate scan signals to the pixels on a horizontal line-by-horizontal line basis, wherein from among the pixels, pixels that are on a same horizontal line along each gate line are configured to initialize a gate electrode, a first electrode and a second electrode of a first transistor to an emission initialization voltage in response to a previous gate initialization signal supplied to pixels of a previous horizontal line and a current compensation gate signal from among the gate scan signals in a first period, to initialize the second electrode of the first transistor to an initialization voltage in response to a current gate initialization signal and the current compensation gate signal from among the gate scan signals in a second period, and to detect and compensate for a threshold voltage of the first transistor in response to the current compensation gate signal and a current write gate signal from among the gate scan signals in a third period.

According to one or more embodiments of the present disclosure, there is provided an electronic device including a display device configured to display an image, wherein the display device comprises a display panel in which a plurality of pixels are arranged in a display area to display an image, and a gate driver configured to supply gate scan signals to the pixels on a horizontal line-by-horizontal line basis, wherein from among the pixels, pixels that are on s same horizontal line along each gate line are configured to initialize a gate electrode, a first electrode and a second electrode of a first transistor to an emission initialization voltage in response to a previous gate initialization signal supplied to pixels of a previous horizontal line and a current compensation gate signal from among the gate scan signals in a first period, to initialize the second electrode of the first transistor to an initialization voltage in response to a current gate initialization signal and the current compensation gate signal from among the gate scan signals in a second period, and to detect and compensate for a threshold voltage of the first transistor in response to the current compensation gate signal and a current write gate signal from among the gate scan signals in a third period.

According to one or more embodiments of a display device according to one or more embodiments of the present disclosure, the number of lines can be reduced by eliminating a control signal generation operation and a corresponding control signal input line needed for a hysteresis improvement operation and an initialization voltage input operation of pixels of each horizontal line.

In addition, according to the display device according to one or more embodiments, because the number of control signal generation operations and the number of corresponding control signal input lines are reduced, the circuit structure of a gate driver can be simplified, and the size and placement area of the gate driver can be reduced.

However, the effects, aspects, and features of the present disclosure are not restricted to the one set forth herein. The above and other effects, aspects, and features of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present disclosure will now be described more fully hereinafter with reference to the accompanying drawings, in which embodiments of the disclosure are shown. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

For the purposes of the present disclosure, expressions such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, XZ, YZ, and ZZ, or any variation thereof. Similarly, the expression such as "at least one of A and/or B" may include A, B, or A and B. As used herein, the term "and/or" includes any and all combinations of one or more of the associated listed items. For example, the expression such as "A and/or B" may include A, B, or A and B. Further, the use of "may" when describing embodiments of the present disclosure refers to "one or more embodiments of the present disclosure".

Each of the features of the various embodiments of the present disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 1:
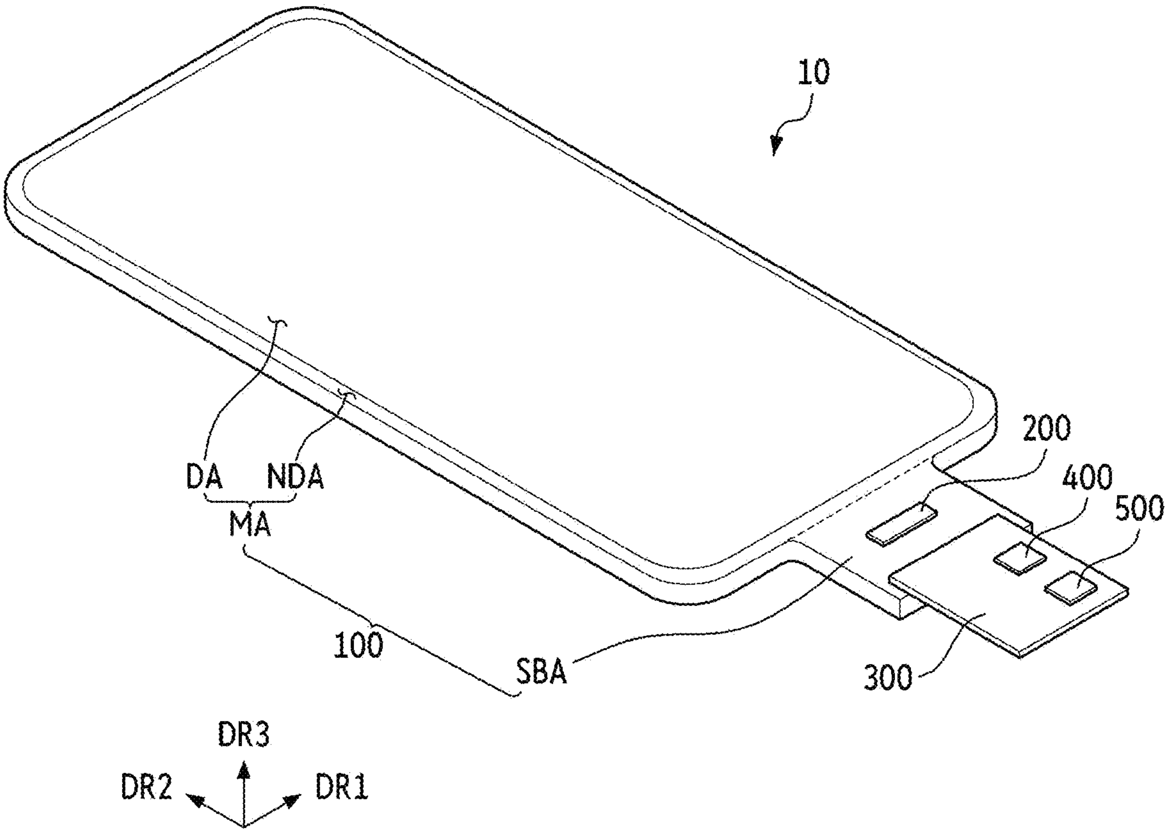
FIG. 1 is a perspective view of a display device according to one or more embodiments.

FIG. 1 is a perspective view of a display device 10 according to one or more embodiments.

The display device 10 illustrated in FIG. 1 may be applied to portable electronic devices such as mobile phones, smartphones, tablet personal computers (PCs), mobile communication terminals, electronic notebooks, electronic books, portable multimedia players (PMPs), navigation devices, and/or ultra-mobile PCs (UMPCs).

In addition, the display device 10 of the present disclosure may be applied as a display unit to electronic devices such as televisions, laptop computers, monitors, billboards, and Internet of things (IoT) devices. For another example, the display device 10 may be applied to wearable electronic devices such as smart watches, watch phones, glasses-type displays, and/or head mounted displays (HMDs).

The display device 10 may have a planar shape similar to a quadrilateral. For example, the display device 10 may have a planar shape similar to a quadrilateral having short sides in a first direction DR1 and long sides in a second direction DR2. Each corner where a short side extending in the first direction DR1 meets a long side extending in the second direction DR2 may be rounded to have a suitable curvature (e.g., a predetermined curvature) or may be right-angled. The planar shape of the display device 10 is not limited to the quadrilateral shape but may also be similar to other polygonal shapes, a circular shape, and/or an oval shape.

The display device 10 may include a display panel 100, a display driver 200, a circuit board 300, a touch driver 400, and a power supply unit 500.

The display panel 100 may include a main area MA and a sub-area SBA.

The main area MA may include a display area DA including pixels that display an image and a non-display area NDA disposed around the display area DA along an edge or a periphery of the display area DA. The display area DA may emit light from a plurality of emission areas or a plurality of opening areas. For example, the display panel 100 may include pixel circuits including switching elements, a pixel defining layer defining the emission areas or the opening areas, and self-light emitting elements.

For example, each of the self-light emitting elements may include, but is not limited to, at least one of an organic light emitting diode (OLED) including an organic light emitting layer, a quantum dot light emitting diode including a quantum dot light emitting layer, an inorganic light emitting diode including an inorganic semiconductor, and a micro light emitting diode.

The non-display area NDA may be an area outside the display area DA. The non-display area NDA may be defined as an edge area of the main area MA of the display panel 100. The non-display area NDA may include a gate driver that supplies gate signals to gate lines and fan-out lines that connect the display driver 200 and the display area DA.

The sub-area SBA may extend from a side of the main area MA. The sub-area SBA may include a flexible material that can be bent, folded, rolled, etc. For example, when the sub-area SBA is bent, it may be overlapped by the main area MA in a thickness direction (e.g., a third direction DR3). The sub-area SBA may include the display driver 200 and a pad unit connected to the circuit board 300. Optionally, the sub-area SBA may be omitted, and the display driver 200 and the pad unit may be disposed in the non-display area NDA.

The display driver 200 may output signals and voltages for driving the display panel 100. The display driver 200 may supply data voltages to data lines. The display driver 200 may supply a power supply voltage to a power line and supply a gate control signal to the gate driver. The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-area SBA and may be overlapped by the main area MA in the thickness direction (third direction DR3) by the bending of the sub-area SBA. For another example, the display driver 200 may be mounted on the circuit board 300.

The circuit board 300 may be attached onto the pad unit of the display panel 100 using an anisotropic conductive film. Lead lines of the circuit board 300 may be electrically connected to the pad unit of the display panel 100. The circuit board 300 may be a flexible printed circuit board (FPCB), a printed circuit board (PCB), or a flexible film such as a chip on film (COF).

The touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and sense the amount of change in capacitance between the touch electrodes. For example, the touch driving signal may be a pulse signal having a suitable frequency (e.g., a predetermined frequency). The touch driver 400 may calculate whether an input has been made and coordinates of the input based on the amount of change in capacitance between the touch electrodes. The touch driver 400 may be formed as an integrated circuit (IC).

The power supply unit 500 may be disposed on the circuit board 300 and may supply a power supply voltage to the display driver 200 and the display panel 100. The power supply unit 500 may generate a driving voltage and supply the driving voltage to a driving voltage line VDL (e.g., see FIG. 4), may generate an initialization voltage and supply the initialization voltage to an initialization voltage line, may generate a bias voltage and supply the bias voltage to a bias voltage line, and may generate a common voltage and supply the common voltage to a common voltage line. Here, the common voltage of the common voltage line may be supplied to a cathode common to light emitting elements ED of a plurality of pixels PX. The driving voltage may be a high potential voltage for driving the light emitting elements ED, and the common voltage may be a low potential voltage for driving the light emitting elements ED.

Figure 2:
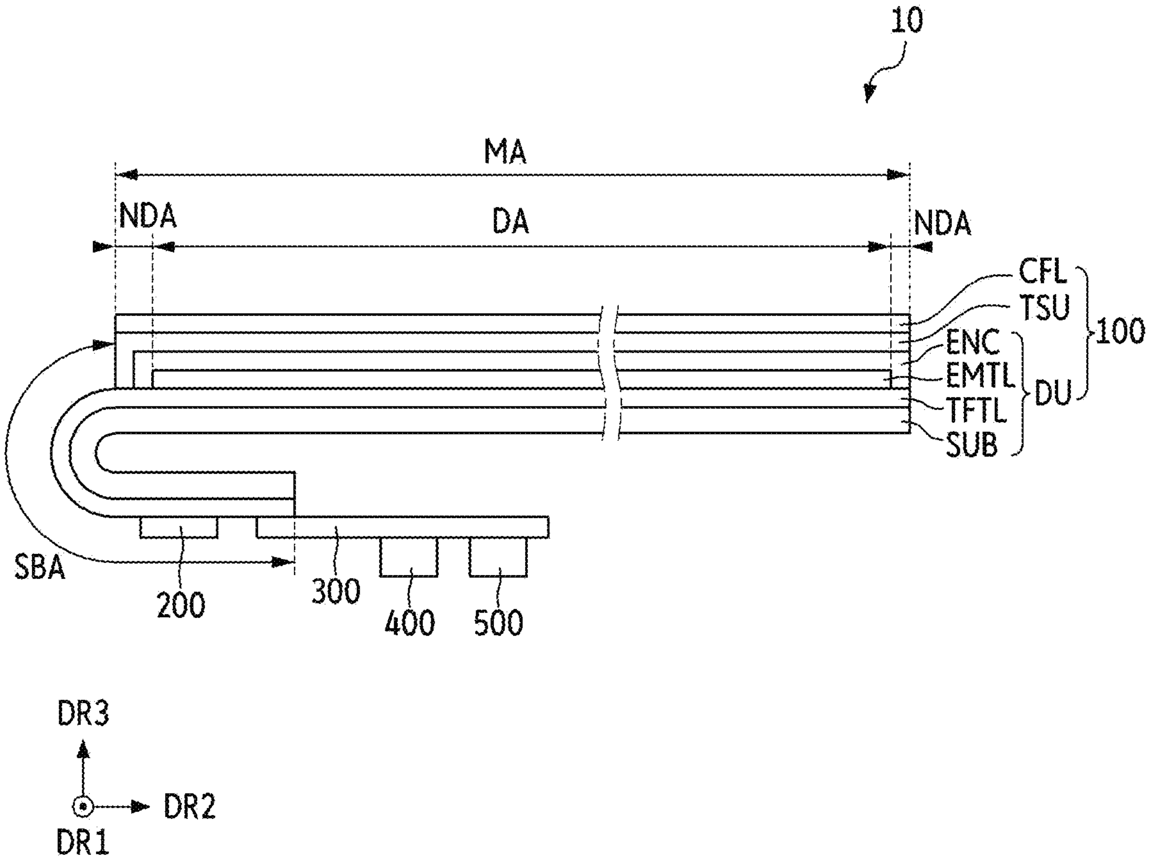
FIG. 2 is a cross-sectional view of the display device according to one or more embodiments.

FIG. 2 is a cross-sectional view of the display device 10 according to one or more embodiments.

Referring to FIG. 2, the display panel 100 may include a display unit DU, a touch sensing unit TSU, and a color filter layer CFL. The display unit DU may include a substrate SUB, a thin-film transistor layer TFTL, a light emitting element layer EMTL, and an encapsulation layer ENC.

The substrate SUB may be a base substrate or a base member. The substrate SUB may be a flexible substrate that can be bent, folded, rolled, etc. For example, the substrate SUB may include polymer resin such as polyimide (PI), a glass material, and/or a metal material.

The thin-film transistor layer TFTL may be disposed on the substrate SUB. The thin-film transistor layer TFTL may include a plurality of thin-film transistors constituting pixel circuits of pixels. The thin-film transistor layer TFTL may further include gate lines, data lines, power lines, gate control lines, fan-out lines connecting the display driver 200 and the data lines, and lead lines connecting the display driver 200 and the pad unit. Each of the thin-film transistors may include a semiconductor region, a source electrode, a drain electrode, and a gate electrode. For example, when the gate driver is formed on a side of the non-display area NDA of the display panel 100, it may include thin-film transistors.

The thin-film transistor layer TFTL may be disposed in the display area DA, the non-display area NDA, and the sub-area SBA. The thin-film transistors of the pixels, the gate lines, the data lines, and the power lines of the thin-film transistor layer TFTL may be disposed in the display area DA. The gate control lines and the fan-out lines of the thin-film transistor layer TFTL may be disposed in the non-display area NDA. The lead lines of the thin-film transistor layer TFTL may be disposed in the sub-area SBA.

The light emitting element layer EMTL may be disposed on the thin-film transistor layer TFTL. The light emitting element layer EMTL may include a plurality of light emitting elements ED, each including a first electrode (hereinafter, referred to as an anode), a light emitting layer, and a second electrode (hereinafter, referred to as a cathode) sequentially stacked to emit light, and a pixel defining layer defining the pixels. The light emitting elements ED of the light emitting element layer EMTL may be disposed in the display area DA.

For example, the light emitting layer may be an organic light emitting layer including an organic material. The light emitting layer may include a hole transporting layer, an organic light emitting layer, and an electron transporting layer. When the anode receives a suitable voltage (e.g., a predetermined voltage) through a thin-film transistor of the thin-film transistor layer TFTL and the cathode receives a cathode voltage, holes and electrons may move to the organic light emitting layer through the hole transporting layer and the electron transporting layer, respectively. Then, the holes and the electrons may be combined with each other in the organic light emitting layer to emit light.

For another example, each of the light emitting elements ED may include a quantum dot light emitting diode including a quantum dot light emitting layer, an inorganic light emitting diode including an inorganic semiconductor, or a micro light emitting diode.

The encapsulation layer ENC may cover upper and side surfaces of the light emitting element layer EMTL and may protect the light emitting element layer EMTL. The encapsulation layer ENC may include at least one inorganic layer and at least one organic layer to encapsulate the light emitting element layer EMTL.

The touch sensing unit TSU may be disposed on the encapsulation layer ENC. The touch sensing unit TSU may include a plurality of touch electrodes for sensing a user's touch in a capacitive manner and touch lines connecting the touch electrodes and the touch driver 400. For example, the touch sensing unit TSU may sense a user's touch in a mutual capacitance manner or a self-capacitance manner.

For another example, the touch sensing unit TSU may be disposed on a separate substrate disposed on the display unit DU. In this case, the substrate supporting the touch sensing unit TSU may be a base member that encapsulates the display unit DU.

The touch electrodes of the touch sensing unit TSU may be disposed in a touch sensor area overlapping the display area DA. The touch lines of the touch sensing unit TSU may be disposed in a touch peripheral area overlapping the non-display area NDA.

The color filter layer CFL may be disposed on the touch sensing unit TSU. The color filter layer CFL may include a plurality of color filters corresponding to a plurality of emission areas, respectively. Each of the color filters may selectively transmit light of a specific wavelength and block or absorb light of other wavelengths. The color filter layer CFL may absorb a part of light coming from the outside of the display device 10, thereby reducing reflected light caused by the external light. Therefore, the color filter layer CFL can prevent color distortion caused by reflection of external light.

Because the color filter layer CFL is directly disposed on the touch sensing unit TSU, the display device 10 may not require a separate substrate for the color filter layer CFL. Therefore, a thickness of the display device 10 can be relatively reduced.

The sub-area SBA of the display panel 100 may extend from a side of the main area MA. The sub-area SBA may include a flexible material that can be bent, folded, rolled, etc. For example, when the sub-area SBA is bent, it may be overlapped by the main area MA in the thickness direction (third direction DR3). The sub-area SBA may include the display driver 200 and the pad unit electrically connected to the circuit board 300.

Figure 3:
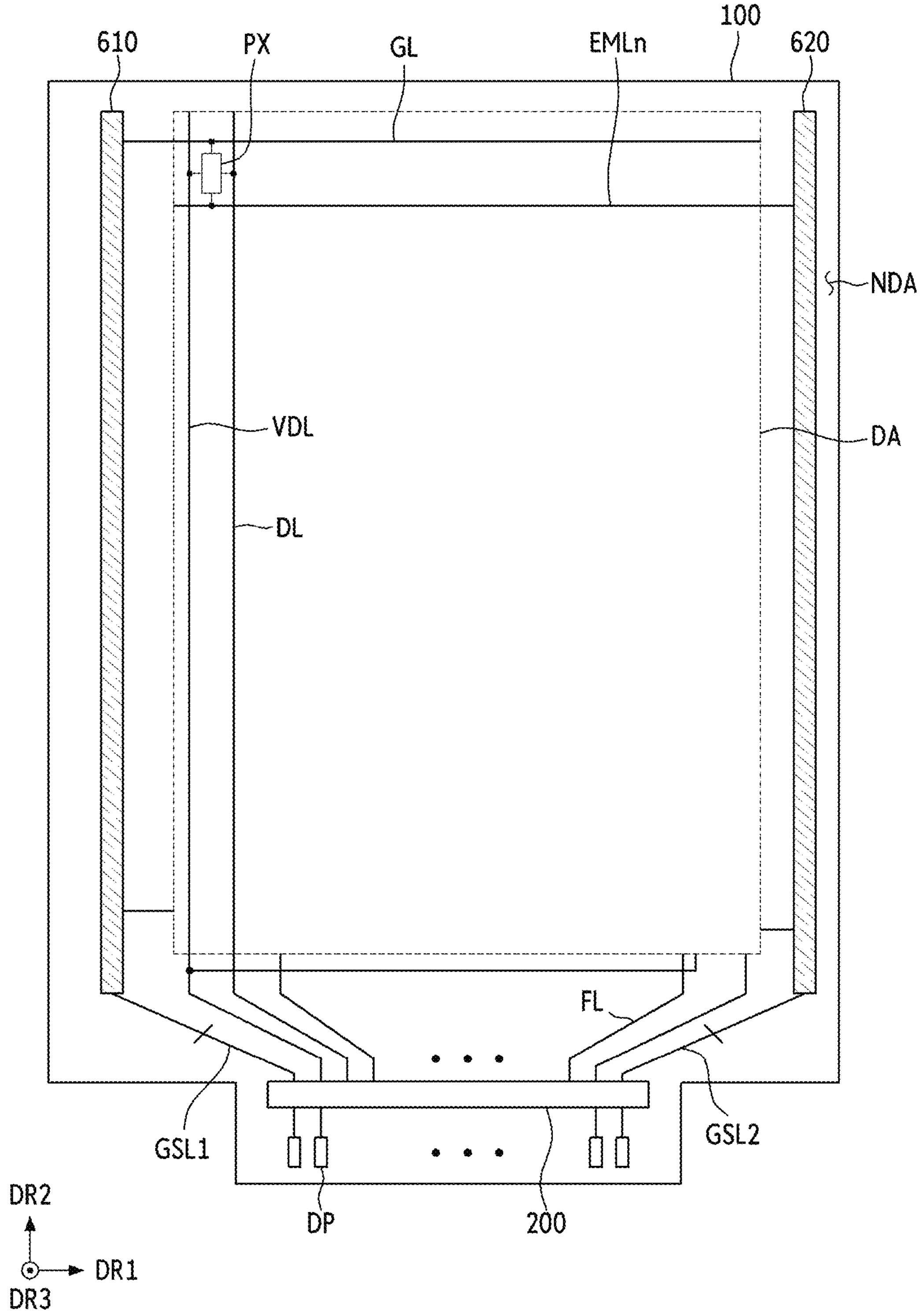
FIG. 3 is a plan view of a display unit of the display device according to one or more embodiments.
Figure 4:
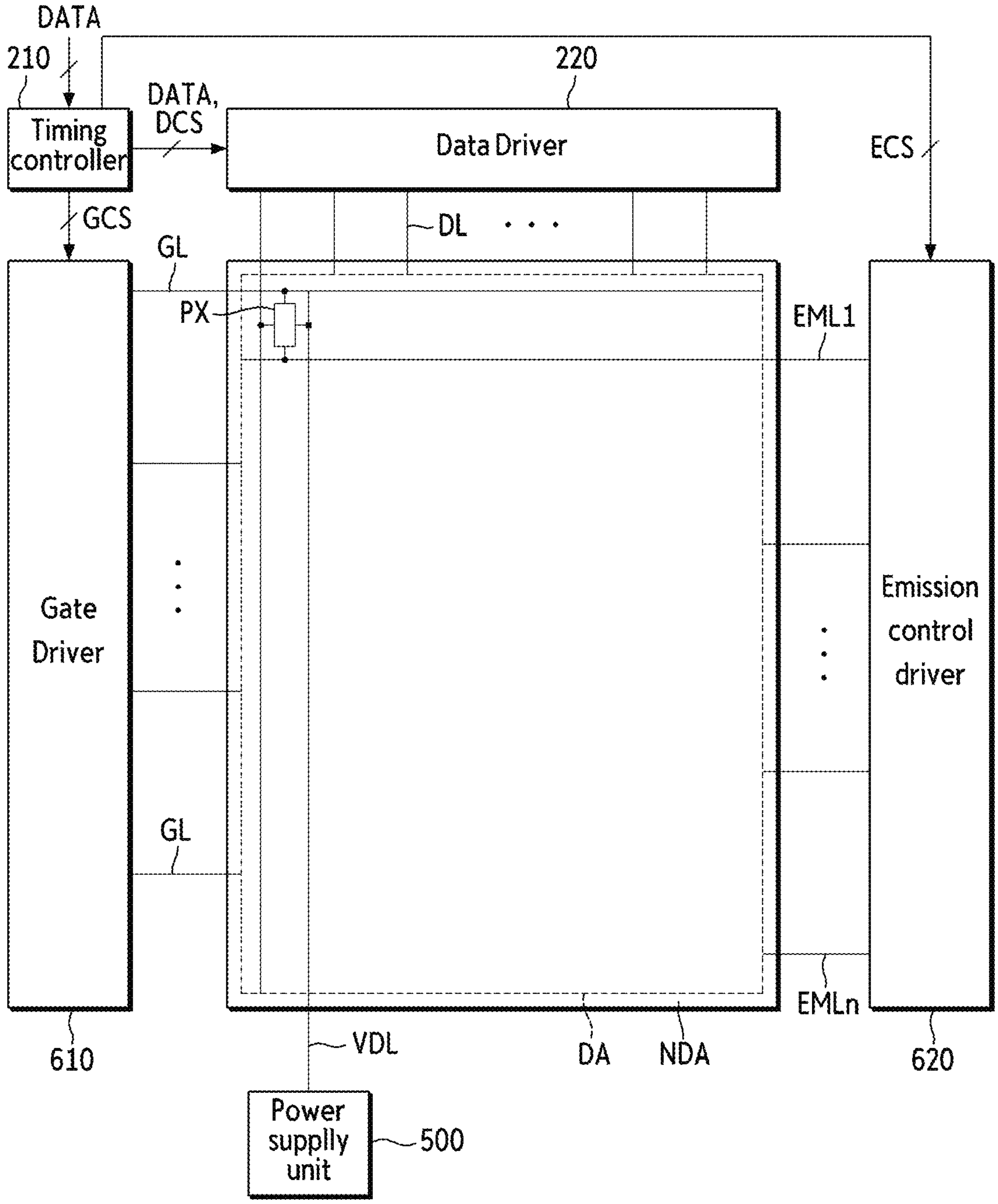
FIG. 4 is a block diagram of a display panel and a display driver according to one or more embodiments.

FIG. 3 is a plan view of the display unit DU of the display device 10 according to one or more embodiments. FIG. 4 is a block diagram of the display panel 100 and the display driver 200 according to one or more embodiments.

Referring to FIGS. 3 and 4, the display area DA of the display panel 100 may include a plurality of pixels PX, a plurality of driving voltage lines VDL connected to the pixels PX, a plurality of gate lines GL of a plurality of common voltage lines VSL (see FIG. 5), a plurality of $n^{th}$ emission lines EMLn, and a plurality of data lines DL.

Each of the pixels PX may be connected to a gate line GL, a data line DL, an $n^{th}$ emission line EMLn, a driving voltage line VDL, and a common voltage line VSL. Each of the pixels PX may include at least one thin-film transistor, a light emitting element ED, and a capacitor.

The gate lines GL may extend in the first direction DR1 and may be spaced (e.g., spaced apart) from each other in the second direction DR2 intersecting the first direction DR1. The gate lines GL may be arranged along the second direction DR2. The gate lines GL may sequentially supply gate signals to the pixels PX.

The $n^{th}$ emission lines EMLn may extend in the first direction DR1 and may be spaced (e.g., spaced apart) from each other in the second direction DR2. The $n^{th}$ emission lines EMLn may be arranged along the second direction DR2. The $n^{th}$ emission lines EMLn may sequentially supply emission signals to the pixels PX.

The data lines DL may extend in the second direction DR2 and may be spaced (e.g., spaced apart) from each other in the first direction DR1. The data lines DL may be arranged along the first direction DR1. The data lines DL may supply data voltages to the pixels PX. A data voltage may determine the luminance of each of the pixels PX.

The driving voltage lines VDL may extend in the second direction DR2 and may be spaced (e.g., spaced apart) from each other in the first direction DR1. The driving voltage lines VDL may be arranged along the first direction DR1. The driving voltage lines VDL may supply driving voltages to the pixels PX. The driving voltages may be high potential voltages for driving the light emitting elements ED of the pixels PX.

The non-display area NDA may be around (e.g., may surround) the display area DA. The non-display area NDA may include a gate driver 610, an emission control driver 620, fan-out lines FL, a first gate control line GSL1, and a second gate control line GSL2.

The fan-out lines FL may extend from the display driver 200 to the display area DA. The fan-out lines FL may supply data voltages received from the display driver 200 to the data lines DL.

The first gate control line GSL1 may extend from the display driver 200 to the gate driver 610. The first gate control line GSL1 may supply a gate control signal GCS received from the display driver 200 to the gate driver 610.

The second gate control line GSL2 may extend from the display driver 200 to the emission control driver 620. The second gate control line GSL2 may supply an emission control signal ECS received from the display driver 200 to the emission control driver 620.

The sub-area SBA may extend from a side of the non-display area NDA. The sub-area SBA may include the display driver 200 and a pad unit DP. The pad unit DP may be disposed closer to an edge of the sub-area SBA than the display driver 200. The pad unit DP may be electrically connected to the circuit board 300 through an anisotropic conductive film.

The display driver 200 may include a timing controller 210 and a data driver 220.

The timing controller 210 may receive digital video data DATA and timing signals from the circuit board 300. The timing controller 210 may control the operation timing of the data driver 220 by generating a data control signal DCS based on the timing signals, may control the operation timing of the gate driver 610 by generating the gate control signal GCS, and may control the operation timing of the emission control driver 620 by generating the emission control signal ECS. The timing controller 210 may supply the gate control signal GCS to the gate driver 610 through the first gate control line GSL1. The timing controller 210 may supply the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages and supply the analog data voltages to the data lines DL through the fan-out lines FL. Gate signals of the gate driver 610 may select pixels PX to which the data voltages are to be supplied, and the selected pixels PX may receive the data voltages through the data lines DL.

The power supply unit 500 may be disposed on the circuit board 300 to supply a power supply voltage to the display driver 200 and the display panel 100. The power supply unit 500 may generate a driving voltage and supply the driving voltage to the driving voltage lines VDL, may generate an initialization voltage and supply the initialization voltage to initialization voltage lines VIL (e.g., see FIG. 5), may generate a common voltage and supply the common voltage to a cathode electrode to the light emitting elements ED of the pixels PX.

The gate driver 610 may be disposed outside one side of the display area DA or on one side of the non-display area NDA, and the emission control driver 620 may be disposed outside the other side of the display area DA or on the other side of the non-display area NDA. However, the present disclosure is not limited thereto. For another example, the gate driver 610 and the emission control driver 620 may be disposed on either one side or the other side of the non-display area NDA. The gate driver 610 and the emission control driver 620 may also be formed integrally with each other. That is, the gate driver 610 and the emission control driver 620 may also be formed as a one chip type.

The gate driver 610 may include a plurality of thin-film transistors that generate gate signals based on the gate control signal GCS. The emission control driver 620 may include a plurality of thin-film transistors that generate emission signals based on the emission control signal ECS. For example, the thin-film transistors of the gate driver 610 and the thin-film transistors of the emission control driver 620 may be formed on a same layer as the thin-film transistors of the pixels PX. The gate driver 610 may supply the gate signals to the gate lines GL, and the emission control driver 620 may supply the emission signals to the $n^{th}$ emission control lines EMLn.

Figure 5:
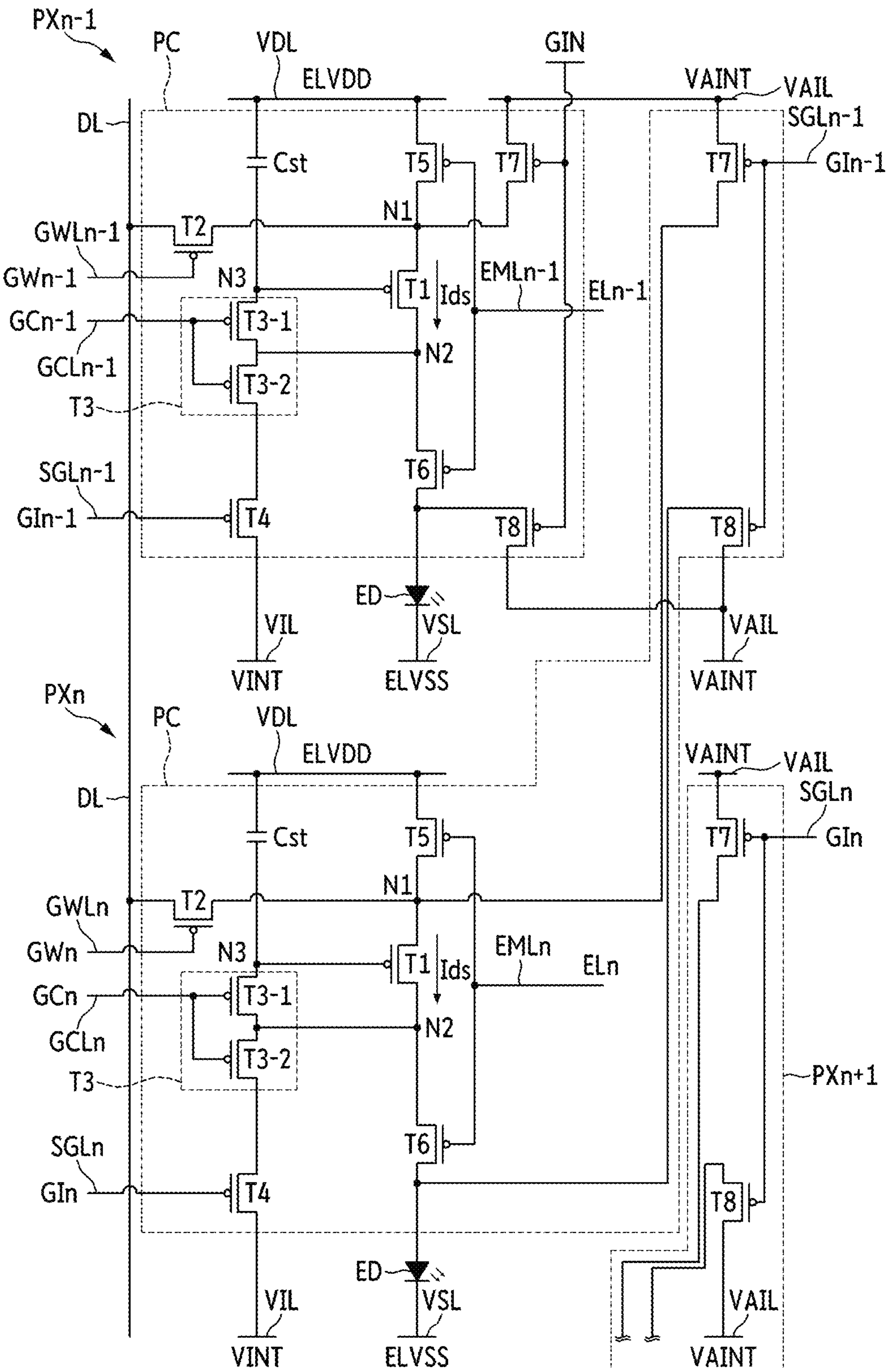
FIG. 5 is a circuit diagram of pixels adjacent to each other in a data line direction of a display device according to a first embodiments.
Figure 6:
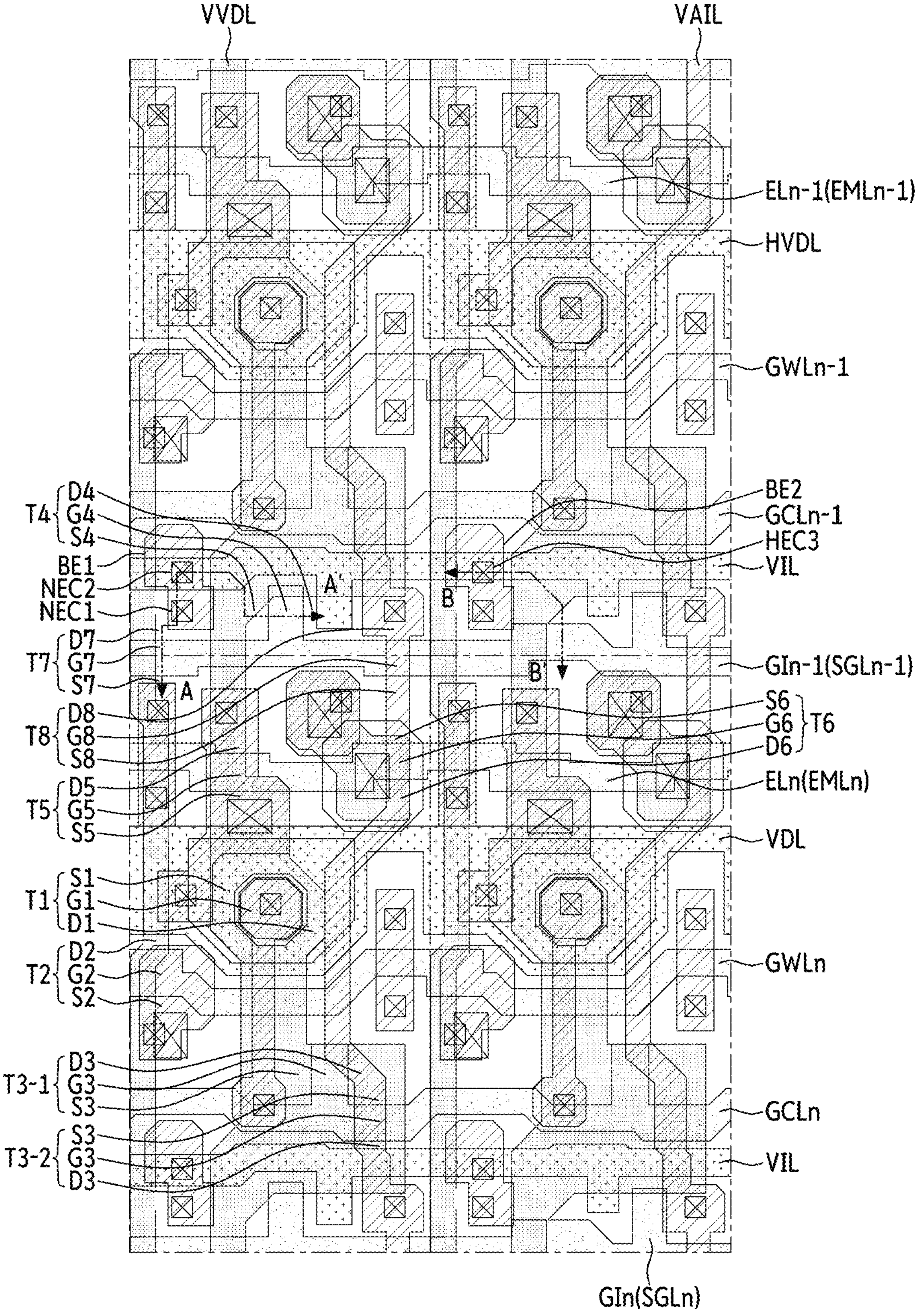
FIG. 6 is a detailed plan layout view of the adjacent pixels according to the first embodiment.

FIG. 5 is a circuit diagram of pixels adjacent to each other in a data line direction of a display device according to a first embodiment. FIG. 6 is a detailed plan layout view of the adjacent pixels according to the first embodiment.

As illustrated in FIG. 5, pixels PXn−1 and PXn are arranged in the second direction DR2 along each data line DL so that they are connected in a parallel structure to each data line DL extending in the second direction DR2.

For example, in the case of an $n^{th}$ pixel PXn, an $(n-1)^{th}$ pixel PXn−1 is disposed above the $n^{th}$ pixel PXn along a data line DL, and an $(n+1)^{th}$ pixel PXn+1 is disposed below the $n^{th}$ pixel PXn. Here, n is a positive integer.

When the $(n-1)^{th}$ pixel PXn−1 is a first pixel disposed on a first horizontal line, it may receive a bias control signal GIN from the gate driver 610 through a separate bias control line. Seventh and eighth transistors T7 and T8 included in $(n-1)^{th}$ pixels PXn−1 of the first horizontal line may be turned on concurrently (e.g., simultaneously) in response to the bias control signal GIN.

On the other hand, each $n^{th}$ pixel PXn disposed on a second horizontal line and subsequent horizontal lines may be connected to a data line DL, an $n^{th}$ write gate line GWLn, an $n^{th}$ compensation gate line GCLn, an $n^{th}$ initialization gate line SGLn, a previous $(n-1)^{th}$ initialization gate line SGLn−1, an $n^{th}$ emission line EMLn, a driving voltage line VDL, a common voltage line VSL, an initialization voltage line VIL, and an emission initialization voltage line VAIL. Here, the initialization voltage line VIL and the emission initialization voltage line VAIL may be electrically connected to transmit an initialization voltage of the same magnitude. In addition, the driving voltage line VDL includes a horizontal driving voltage line HVDL arranged along the first direction DR1 and a vertical driving voltage line VVDL arranged along the second direction DR2. The horizontal driving voltage line HVDL and the vertical driving voltage line VVDL may be electrically connected through at least one contact hole.

Each $n^{th}$ pixel PXn may include a pixel circuit PC and a light emitting element ED. The pixel circuit PC may include a first transistor T1, a second transistor T2, a third transistor T3, a fourth transistor T4, a fifth transistor T5, a sixth transistor T6, a seventh transistor T7, an eighth transistor T8, and at least one capacitor Cst.

Referring to FIG. 6 together with FIG. 5, the first transistor T1 may include a first gate electrode G1, a first source electrode S1, and a first drain electrode D1. The first transistor T1 may control the amount of current (hereinafter, referred to as a driving current) flowing between the first source electrode S1 and the first drain electrode D1 according to the magnitude of a data voltage applied to the first gate electrode G1 through a third node N3 and the third transistor T3. The driving current (e.g., Ids) flowing through a channel region of the first transistor T1 may be proportional to the square of a difference between a voltage Vgs between the first source electrode S1 and the first gate electrode G1 of the first transistor T1 and a threshold voltage Vth ($Ids=k\times(Vgs-Vth)^2$), where k is a proportional coefficient determined by the structure and physical characteristics of the first transistor T1, Vgs is a source-gate voltage of the first transistor T1, and Vth is a threshold voltage of the first transistor T1.

The light emitting element ED may receive the driving current Ids and emit light. The amount of light emitted from the light emitting element ED or the luminance of the light emitting element ED may be proportional to the amount of the driving current Ids.

The light emitting element ED may be an organic light emitting diode including an anode, a cathode, and an organic light emitting layer disposed between these electrodes (i.e., the anode and the cathode). For another example, the light emitting element ED may be an inorganic light emitting element ED including an anode, a cathode, and an inorganic semiconductor disposed between these electrodes (i.e., the anode and the cathode). For another example, the light emitting element ED may be a quantum dot light emitting element ED including an anode, a cathode, and a quantum dot light emitting layer disposed between these electrodes (i.e., the anode and the cathode). For another example, the light emitting element ED may be a micro light emitting diode.

The anode of the light emitting element ED may be electrically connected to a second node N2. The anode of the light emitting element ED may be connected to a drain electrode of the sixth transistor T6 and may be connected to the second node N2 thought the sixth transistor T6. The cathode of the light emitting element ED may be connected to the common voltage line VSL. The cathode of the light emitting element ED may receive a common voltage ELVSS (e.g., a low potential voltage) from the common voltage line VSL.

The second transistor T2 may be turned on by an $n^{th}$ write gate signal GWn from the $n^{th}$ write gate line GWLn to electrically connect the data line DL and a first node N1 to which the first source electrode S1 of the first transistor T1 is connected. The second transistor T2 may be turned on in response the $n^{th}$ write gate signal GWn of a gate-on voltage magnitude to supply a data voltage to the first node N1. To this end, the second transistor T2 may have a second gate electrode G2 electrically connected to the $n^{th}$ write gate line GWLn, a second source electrode S2 electrically connected to the data line DL, and a second drain electrode D2 electrically connected to the first node N1.

The third transistor T3 may be configured in a dual-gate transistor structure having two gate electrodes. Specifically, as illustrated in FIG. 6, the third transistor T3 may be formed in a dual-gate transistor structure in which a $(3\text{-}1)^{th}$ transistor T3-1 and a $(3\text{-}2)^{th}$ transistor T3-2 are connected and disposed in a parallel structure to the $n^{th}$ compensation gate line GCLn.

The third transistor T3 may be connected in a parallel structure to the $n^{th}$ compensation gate line GCLn and may be connected between a third node N3 and the second node N2. Accordingly, the third transistor T3 may be turned on by an $n^{th}$ compensation gate signal GCn from the $n^{th}$ compensation gate line GCLn to electrically connect the second node N2 which is the first drain electrode D1 of the first transistor T1 and the third node N3 which is the first gate electrode G1 of the first transistor T1.

Specifically, a third gate electrode G3, which is a dual-gate electrode of the third transistor T3, may be electrically connected to the $n^{th}$ compensation gate line GCLn, a third source electrode S3 of one of the $(3\text{-}1)^{th}$ transistor T3-1 or the $(3\text{-}2)^{th}$ transistor T3-2 may be electrically connected to the second node N2, and a third drain electrode D3 (of the $(3\text{-}1)^{th}$ transistor T3-1) may be electrically connected to the third node N3. In one or more embodiments, the source electrode of the $(3\text{-}2)^{th}$ transistor T3-2 may be connected to the fourth transistor T4 and the drain electrode of the $(3\text{-}2)^{th}$ transistor T3-2 may be connected to the second node N2. The third transistor T3 may be turned on by the $n^{th}$ compensation gate signal GCn of a gate-on voltage magnitude input from the $n^{th}$ compensation gate line GCLn to electrically connect the second node N2 which is the first drain electrode D1 of the first transistor T1 and the third node N3 which is the first gate electrode G1 of the first transistor T1.

The fourth transistor T4 may be turned on by an $n^{th}$ initialization gate signal GIn from the $n^{th}$ initialization gate line SGLn to electrically connect the third transistor T3 and the second node N2 to the initialization voltage line VIL through the third transistor T3. The fourth transistor T4 may be connected between the third source electrode S3 of the third transistor T3 (e.g., the source electrode of the $(3\text{-}2)^{th}$ transistor T3-2) and the initialization voltage line VIL. For example, the fourth transistor T4 may have a fourth gate electrode G4 electrically connected to the $n^{th}$ initialization gate line SGLn, a fourth source electrode S4 electrically connected to the initialization voltage line VIL, and a fourth drain electrode D4 electrically connected to the third source electrode S3 of the third transistor T3. For example, the fourth transistor T4 may also be formed in a dual-gate transistor structure. The initialization voltage line VIL transmits an initialization voltage VINT.

The fourth transistor T4 that operates in response to the $n^{th}$ initialization gate signal GIn and the seventh and eighth transistors T7 and T8 that operate in response to a previous $(n-1)^{th}$ initialization gate signal GIn−1 may be formed as transistors of the same type, for example, may be formed as p-type transistors. For example, each of the fourth transistor T4 and the seventh and eighth transistors T7 and T8 may be formed as a p-type transistor including an active layer of a low-temperature polycrystalline silicon type.

The fifth transistor T5 may be turned on by an $n^{th}$ emission signal ELn from the $n^{th}$ emission line EMLn to electrically connect the driving voltage line VDL and the first node N1 to which the first source electrode S1 of the first transistor T1 is connected. The fifth transistor T5 may have a fifth gate electrode G5 electrically connected to the $n^{th}$ emission line EMLn, a fifth source electrode S5 electrically connected to the driving voltage line VDL, and a fifth drain electrode D5 electrically connected to the first node N1.

The sixth transistor T6 may be turned on by the $n^{th}$ emission signal ELn from the $n^{th}$ emission line EMLn to electrically connect the second node N2 to which the first drain electrode D1 of the first transistor T1 is connected and the anode of the emission element ED. The sixth transistor T6 may have a sixth gate electrode G6 electrically connected to the $n^{th}$ emission line EMLn, a sixth drain electrode D6 electrically connected to the second node N2, and a sixth source electrode S6 electrically connected to the anode of the emission element ED. When the fifth transistor T5, the first transistor T1, and the sixth transistor T6 are all turned on, the driving current Ids may be supplied to the emission element ED.

The seventh transistor T7 may be turned on by the $(n-1)^{th}$ initialization gate signal GIn−1 from a previous initialization gate line, i.e., the $(n-1)^{th}$ initialization gate line SGLn−1 to electrically connect the emission initialization voltage line VAIL and the first node N1 to which the first source electrode S1 of the first transistor T1 is connected. The seventh transistor T7 may be turned on in response to the previous $(n-1)^{th}$ initialization gate signal GIn−1 of a gate-on voltage magnitude to supply the initialization voltage VINT to the first node N1. The seventh transistor T7 may improve the hysteresis of the first transistor T1 by supplying the initialization voltage VINT as a bias voltage to the first source electrode S1 of the first transistor T1. To this end, the seventh transistor T7 may have a seventh gate electrode G7 electrically connected to the $(n-1)^{th}$ initialization gate line SGLn−1 of the $(n-1)^{th}$ pixel PXn−1 which is a previous pixel, a seventh source electrode S7 electrically connected to the emission initialization voltage line VAIL, and a seventh drain electrode D7 electrically connected to the first node N1.

The eighth transistor T8, like the seventh transistor T7, is turned on by the $(n-1)^{th}$ initialization gate signal GIn−1 from the previous initialization gate line, i.e., the $(n-1)^{th}$ initialization gate line SGLn−1. The eighth transistor T8 is turned on by the previous $(n-1)^{th}$ initialization gate signal GIn−1 to electrically connect the anode of the current light emitting element ED and the emission initialization line VAIL. To this end, the eighth transistor T8 may have an eighth gate electrode G8 electrically connected to the $(n-1)^{th}$ initialization gate line SGLn−1 of the $(n-1)^{th}$ pixel PXn−1 which is the previous pixel, an eighth source electrode S8 connected to the emission initialization line VAIL, and an eighth drain electrode D8 electrically connected to an anode connection node of the current light emitting element ED. The eighth transistor T8 that is turned on in response to the previous $(n-1)^{th}$ initialization gate signal GIn−1 allows a current of the anode of the light emitting element ED to flow to the emission initialization line VAIL. The eighth transistor T8 may be formed as a double-gate type transistor. An emission initialization voltage VAINT having the same voltage magnitude as the initialization voltage VINT may be supplied to the emission initialization line VAIL.

The seventh and eighth transistors T7 and T8 are turned on by the $(n-1)^{th}$ initialization gate signal GIn−1 from the previous initialization gate line, i.e., the $(n-1)^{th}$ initialization gate line SGLn−1 without being supplied with a bias control signal. Accordingly, because the gate driver 610 does not need to additionally generate a control signal such as a bias control signal, the internal circuit structure of the gate driver 610 can be simplified, and the size and formation area of the gate driver 610 can be reduced.

The capacitor Cst may be electrically connected between the third node N3 which is the first gate electrode G1 of the first transistor T1 and the driving voltage line VDL. For example, a first electrode of the capacitor Cst may be electrically connected to the third node N3, and a second electrode of the capacitor Cst may be electrically connected to the driving voltage line VDL, thereby maintaining a potential difference between the driving voltage line VDL and the first gate electrode G1 of the first transistor T1.

The initialization voltage VINT and the emission initialization voltage VAINT may be greater than a driving voltage ELVDD, and the driving voltage ELVDD may be greater than the common voltage ELVSS. However, the present disclosure is not limited thereto. For example, the common voltage ELVSS may be equal to or smaller than the initialization voltage VINT. The emission initialization voltage VAINT may be lower than the initialization voltage VINT or may be a voltage of the same magnitude as that of the initialization voltage VINT. The emission initialization voltage VAINT and the initialization voltage VINT may be voltages (e.g., a voltage of 5 [V]) close to a black gray level. Each $n^{th}$ pixel PXn of FIGS. 3 and 4 described above may be formed to have the circuit configuration illustrated in FIG. 5.

Figure 7:
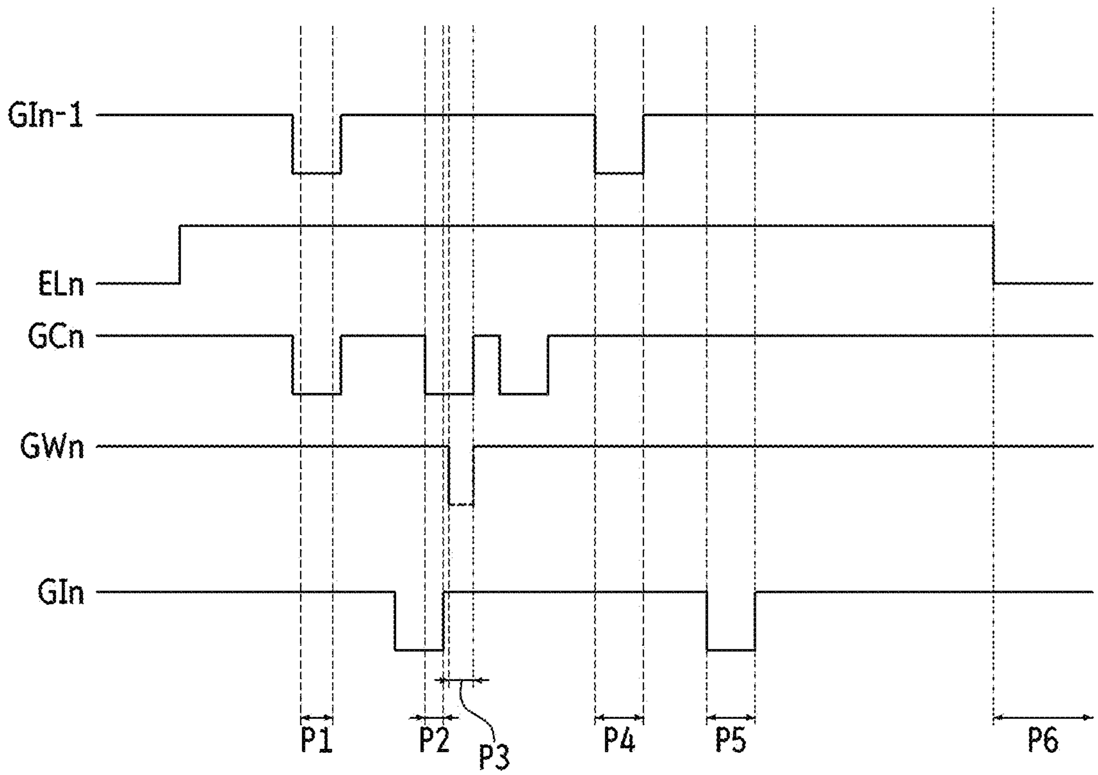
FIG. 7 is a timing diagram of a previous initialization gate signal, an emission signal, a compensation gate signal, a write gate signal, and an initialization gate signal of FIG. 5.

FIG. 7 is a timing diagram of a previous initialization gate signal, an emission signal, a compensation gate signal, a write gate signal, and an initialization gate signal of FIG. 5.

Specifically, FIG. 7 is a timing diagram of the previous $(n-1)^{th}$ initialization gate signal GIn−1, the $n^{th}$ emission signal ELn, the $n^{th}$ compensation gate signal GCn, the $n^{th}$ write gate signal GWn, and the $n^{th}$ initialization gate signal GIn illustrated in FIGS. 5 and 6.

The gate driver 610 generates gate scan signals including the $n^{th}$ compensation gate signal GCn, the previous $(n-1)^{th}$ initialization gate signal GIn−1, and the modulated $n^{th}$ initialization gate signal GIn based on the gate control signal GCS input from the timing controller 210.

The gate driver 610 may include a first shift register that sequentially generates the $n^{th}$ initialization gate signal GIn and the $n^{th}$ compensation gate signal GCn in response to the gate control signal GCS and outputs the $n^{th}$ initialization gate signal GIn and the $n^{th}$ compensation gate signal GCn to the $n^{th}$ initialization gate line SGLn and the $n^{th}$ compensation gate line GCLn, respectively.

The emission control driver 620 may include a second shift register which sequentially generates the $n^{th}$ emission signals ELn in response to the emission control signal ECS and outputs the $n^{th}$ emission signal ELn to each $n^{th}$ emission line EMLn. Specifically, the emission control driver 620 generates emission scan signals including the $n^{th}$ write gate signal GWn and the $n^{th}$ emission signal ELn based on the emission control signal ECS input from the timing controller 210.

Referring to FIGS. 6 and 7, the pixels PX of the display device 10 may operate in operation periods divided into a first period P1, a second period P2, a third period P3, a fourth period P4, a fifth period P5, and a sixth period P6.

The $n^{th}$ emission signal ELn, the $n^{th}$ compensation gate signal GCn, the $n^{th}$ write gate signal GWn, and the $n^{th}$ initialization gate signal GIn are each changed to an active level or a non-active level in each of the first through sixth periods P1 through P6. Here, the active level of each of the signals ELn, GCn, GWn, and GIn described above may refer to a voltage of a gate-on voltage magnitude that can turn on a corresponding transistor to which the signal is transmitted. In other words, a signal at the active level may have a greater or smaller value than a threshold voltage of a corresponding transistor. For example, when a corresponding transistor is an n-type transistor, the active level of a signal transmitted to a gate electrode of the corresponding transistor may refer to a high level (e.g., a positive level or a high voltage level).

The non-active level of each of the signals ELn, GCn, GWn, and GIn may refer to a voltage of a level that can turn off a corresponding transistor. In other words, a signal at the non-active level may have a smaller or greater value than a threshold voltage of a corresponding transistor. For example, when a corresponding transistor is an n-type transistor, the non-active level of a signal transmitted to a gate electrode of the corresponding transistor may refer to a low level (e.g., a negative level or a low voltage level).

In contrast, when a corresponding transistor is a p-type transistor, the active level of a signal transmitted to a gate electrode of the corresponding transistor may refer to a low level (e.g., a negative level or a low voltage level), and the non-active level of the signal transmitted to the gate electrode of the corresponding transistor may refer to a high level (e.g., a positive level or a high voltage level).

In the first period P1, the $n^{th}$ compensation gate signal GCn and the previous $(n-1)^{th}$ initialization gate signal GIn−1 may each have the active level. On the other hand, in the first period P1, the $n^{th}$ emission signal ELn, the $n^{th}$ initialization gate signal GIn, and the $n^{th}$ write gate signal GWn may each have the non-active level. The first period P1 may be, for example, a period for improving the hysteresis of the first transistor T1.

In the second period P2, the $n^{th}$ initialization gate signal GIn and the $n^{th}$ compensation gate signal GCn may each have the active level. On the other hand, in the second period P2, the $n^{th}$ emission signal ELn, the previous $(n-1)^{th}$ initialization gate signal GIn−1, and the $n^{th}$ write gate signal GWn may each have the non-active level. The second period P2 may be, for example, a period for initializing the voltage of the first gate electrode G1 of the first transistor T1.

In the third period P3, the $n^{th}$ compensation gate signal GCn and the $n^{th}$ write gate signal GWn may each have the active level. On the other hand, in the third period P3, the $n^{th}$ emission signal ELn, the $n^{th}$ initialization gate signal GIn and the previous $(n-1)^{th}$ initialization gate signal GIn−1 may each have the non-active level. In addition, in the third period P3, a data voltage may be provided to the data line DL. The third period P3 may be, for example, a period for supplying the data voltage to the pixel circuit PC and detecting and compensating for the threshold voltage of the first transistor T1.

In the fourth period P4, the previous $(n-1)^{th}$ initialization gate signal GIn−1 may have the active level. On the other hand, in the fourth period P4, the $n^{th}$ emission signal ELn, the $n^{th}$ initialization gate signal GIn, the $n^{th}$ compensation gate signal GCn, and the $n^{th}$ write gate signal GWn may each have the non-active level. The fourth period P4 may be, for example, a period for improving the expression of a low gray level by discharging the voltage of the first drain electrode D1 of the first transistor T1 and the anode of the light emitting element ED.

In the fifth period P5, the $n^{th}$ initialization gate signal GIn may have the active level. On the other hand, in the fifth period P5, the $n^{th}$ emission signal ELn, the $n^{th}$ compensation gate signal GCn, the $n^{th}$ write gate signal GWn, and the previous $(n-1)^{th}$ initialization gate signal GIn−1 may each have the non-active level. The fifth period P5 may be, for example, a period for further improving the hysteresis of the first transistor T1.

In the sixth period P6, the $n^{th}$ emission signal ELn may have the active level. On the other hand, in the sixth period P6, the $n^{th}$ initialization gate signal GIn, the $n^{th}$ compensation gate signal GCn, the $n^{th}$ write gate signal GWn, and the previous $(n-1)^{th}$ initialization gate signal GIn−1 may each have the non-active level. The sixth period P6 may be a period for emitting light from the light emitting element ED.

The operation of the display device 10 according to the present embodiment will be described as follows with reference to FIGS. 7 through 12. In FIGS. 8 through 13, transistors surrounded by dotted circles may be turned-on transistors, and transistors other than the transistors surrounded by the dotted circles may be turned-off transistors.

Figure 8:
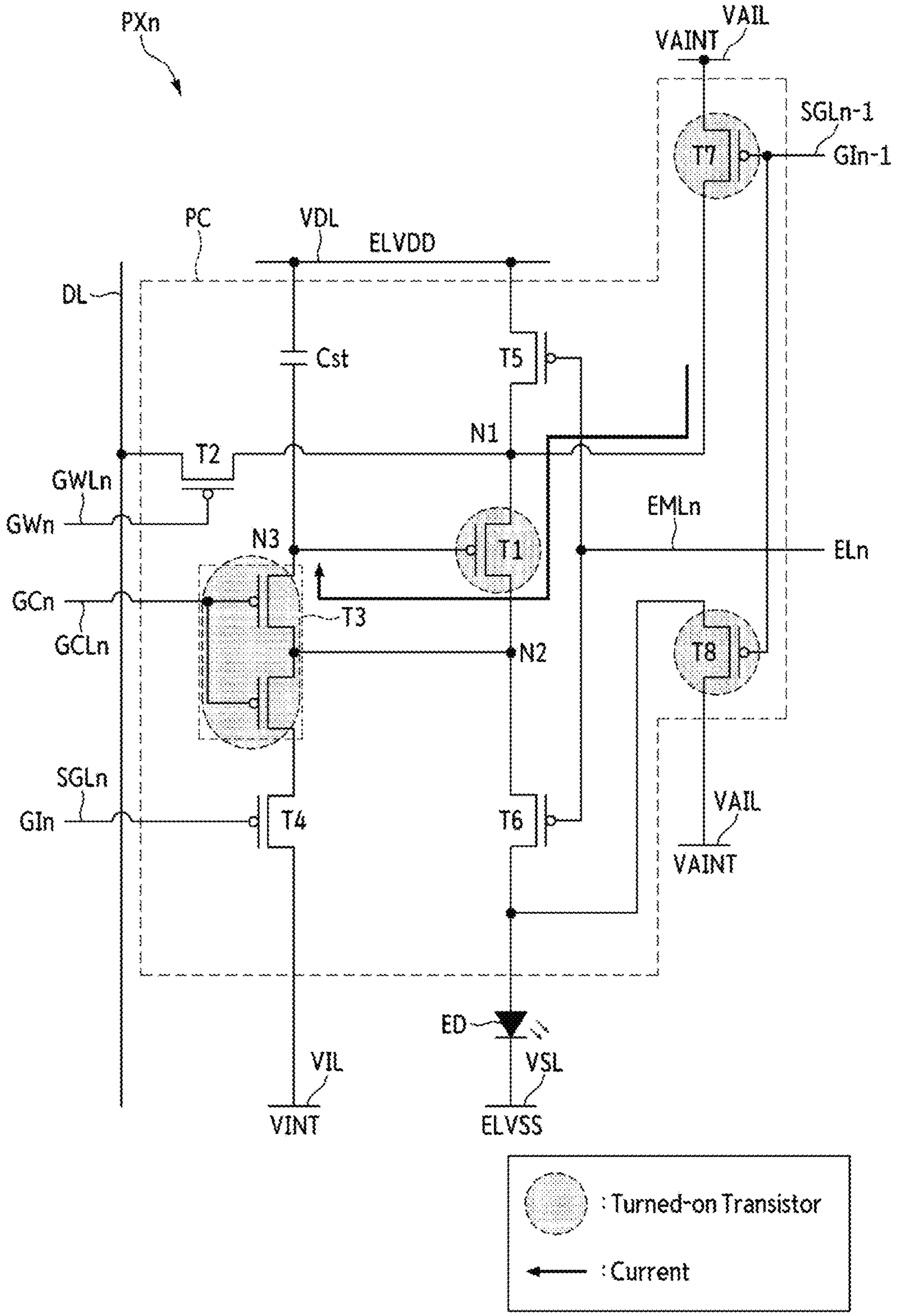
FIG. 8 is a diagram for explaining the operation of a pixel of FIG. 5 in a first period of FIG. 7.

FIG. 8 is a diagram for explaining the operation of a pixel of FIG. 5 in the first period P1 of FIG. 7.

First, the operation of the pixel in the first period P1 will be described as follows with reference to FIGS. 7 and 8.

As illustrated in FIG. 7, in the first period P1, the $n^{th}$ compensation gate signal GCn and the previous $(n-1)^{th}$ initialization gate signal GIn−1 may each have an active level.

On the other hand, in the first period P1, the $n^{th}$ emission signal ELn, the $n^{th}$ write gate signal GWn, and the $n^{th}$ initialization gate signal GIn may each have a non-active level.

The $n^{th}$ compensation gate signal GCn at the active level may be transmitted to the third gate electrode G3 of the third transistor T3 through the $n^{th}$ compensation gate line GCLn. Accordingly, the third transistor T3 may be turned on.

The $(n-1)^{th}$ initialization gate signal GIn−1 at the active level may be transmitted to each of the seventh gate electrode G7 of the seventh transistor T7 and the eighth gate electrode G8 of the eighth transistor T8 through the previous $(n-1)^{th}$ initialization gate line SGLn−1. Accordingly, the seventh transistor T7 and the eighth transistor T8 may be turned on.

The $n^{th}$ write gate signal GWn at the non-active level may be transmitted to the second gate electrode G2 of the second transistor T2 through the $n^{th}$ write gate line GWLn. Accordingly, the second transistor T2 may be turned off.

The $n^{th}$ initialization gate signal GIn at the non-active level may be transmitted to the fourth gate electrode G4 of the fourth transistor T4 through the $n^{th}$ initialization gate line SGLn. Accordingly, the fourth transistor T4 may be turned off.

The $n^{th}$ emission signal ELn at the non-active level may be transmitted to each of the fifth gate electrode G5 of the fifth transistor T5 and the sixth gate electrode G6 of the sixth transistor T6 through the $n^{th}$ emission line EMLn. Accordingly, the fifth transistor T5 and the sixth transistor T6 may be turned off.

As the seventh transistor T7 is turned on as described above, the emission initialization volage VAINT from the emission initialization line VAIL (or one or more other embodiments, the initialization voltage VINT from the current initialization voltage line VIL) may be applied to the first source electrode S1 (e.g., the first node N1) of the first transistor T1 through the turned-on seventh transistor T7. Then, a voltage difference (hereinafter, referred to as a gate-source voltage Vgs) between the first gate electrode G1 of the first transistor T1 and the first source electrode S1 of the first transistor T1 may become greater than the threshold voltage of the first transistor T1. Accordingly, the first transistor T1 may be turned on.

In addition, as the third transistor T3 is turned on by the $n^{th}$ compensation gate signal GCn at the active level, the first gate electrode G1 (e.g., the third node N3) and the first drain electrode D1 (e.g., the second node N2) of the first transistor T1 may be electrically connected to each other. In other words, the first transistor T1 may be connected to the pixel circuit PC in a diode form (e.g., the first transistor T1 may be diode-connected). Accordingly, a current may be generated to flow in a direction from the emission initialization line VAIL toward the first drain electrode D1 (e.g., the second node N2) and the first gate electrode G1 (e.g., the third node N3) of the first transistor T1 through the turned-on first transistor T1 (and the turned-on third transistor T3). Accordingly, the voltage of the first source electrode S1 (e.g., the first node N1) of the first transistor T1 may increase, and when the gate-source voltage (Vgs) of the first transistor T1 becomes equal to the threshold voltage of the first transistor T1, the first transistor T1 may be turned off.

As the first transistor T1, the third transistor T3, and the seventh transistor T7 are turned on as described above, the emission initialization volage VAINT from the emission initialization line VAIL may be applied to each of the first node N1, the second node N2, and the third node N3 through the turned-on first transistor T1, third transistor T3, and seventh transistor T7. Therefore, in the first period P1, the hysteresis of the first transistor T1 can be improved. In addition, in the first period P1, the voltage of the first source electrode S1 of the first transistor T1 may be initialized to the emission initialization volage VAINT (or in one or more other embodiments, the voltage of the first source electrode S1 of the first transistor T1 may be initialized to the initialization voltage VINT).

In one or more embodiments, as the eighth transistor T8 is turned on by the previous $(n-1)^{th}$ initialization gate signal GIn−1 at the active level, the voltage of the anode of the light emitting element ED may be initialized to a voltage of the same magnitude as that of the emission initialization voltage VAINT of the emission initialization line VAIL.

Figure 9:
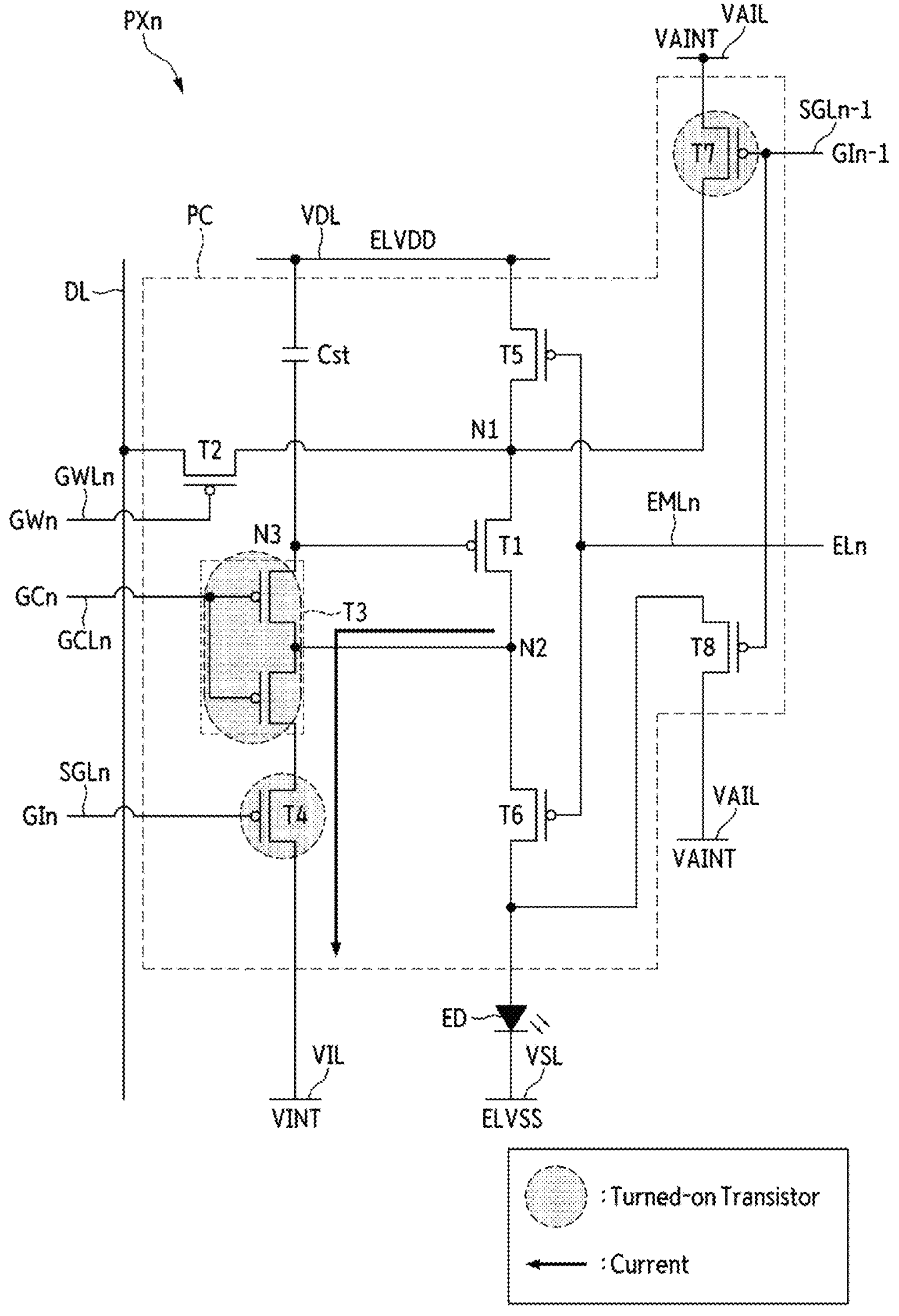
FIG. 9 is a diagram for explaining the operation of the pixel of FIG. 5 in a second period of FIG. 7.

FIG. 9 is a diagram for explaining the operation of the pixel of FIG. 5 in the second period P2 of FIG. 7.

As illustrated in FIG. 7, in the second period P2, the $n^{th}$ initialization gate signal GIn and the $n^{th}$ compensation gate signal GGn may each be supplied at an active level. On the other hand, in the second period P2, the $n^{th}$ emission signal ELn, the $n^{th}$ write gate signal GWn, and the previous $(n-1)^{th}$ initialization gate signal GIn−1 may each be maintained at a non-active level.

The $n^{th}$ compensation gate signal GCn at the active level may be transmitted to the third gate electrode G3 of the third transistor T3 through the $n^{th}$ compensation gate line GCLn. Accordingly, the third transistor T3 may be turned on.

The $n^{th}$ initialization gate signal GIn at the active level may be transmitted to the fourth gate electrode G4 of the fourth transistor T4 through the $n^{th}$ initialization gate line SGLn. Accordingly, the fourth transistor T4 may be turned on.

The $n^{th}$ emission signal ELn at the non-active level may be transmitted to each of the fifth gate electrode G5 of the fifth transistor T5 and the sixth gate electrode G6 of the sixth transistor T6 through the $n^{th}$ emission line EMLn. Accordingly, the fifth transistor T5 and the sixth transistor T6 may be turned off.

The previous $(n-1)^{th}$ initialization gate signal GIn−1 at the non-active level may be transmitted to each of the seventh gate electrode G7 of the seventh transistor T7 and the eighth gate electrode G8 of the eighth transistor T8 through the previous $(n-1)^{th}$ initialization gate line SGLn−1. Accordingly, the seventh transistor T7 and the eighth transistor T8 may be turned off.

As the third transistor T3 is turned on as described above, the first gate electrode G1 (e.g., the third node N3) and the first drain electrode D1 (e.g., the second node N2) of the first transistor T1 may be electrically connected to each other. In one or more embodiments, the first transistor T1 may remain turned off from a previous period (e.g., the second period P1).

As the third transistor T3 and the fourth transistor T4 are turned on as described above, the initialization voltage VINT from the initialization voltage line VIL may be applied to each of the second node N2 and the third node N3 through the turned-on third transistor T3 and fourth transistor T4. Therefore, in the second period P2, the voltage of the first gate electrode G1 of the first transistor T1 and the voltage of the first drain electrode D1 of the first transistor T1 may each be initialized to the initialization voltage VINT.

Next, the operation of a pixel PX in the third period P3 will be described as follows with reference to FIGS. 7 and 10.

Figure 10:
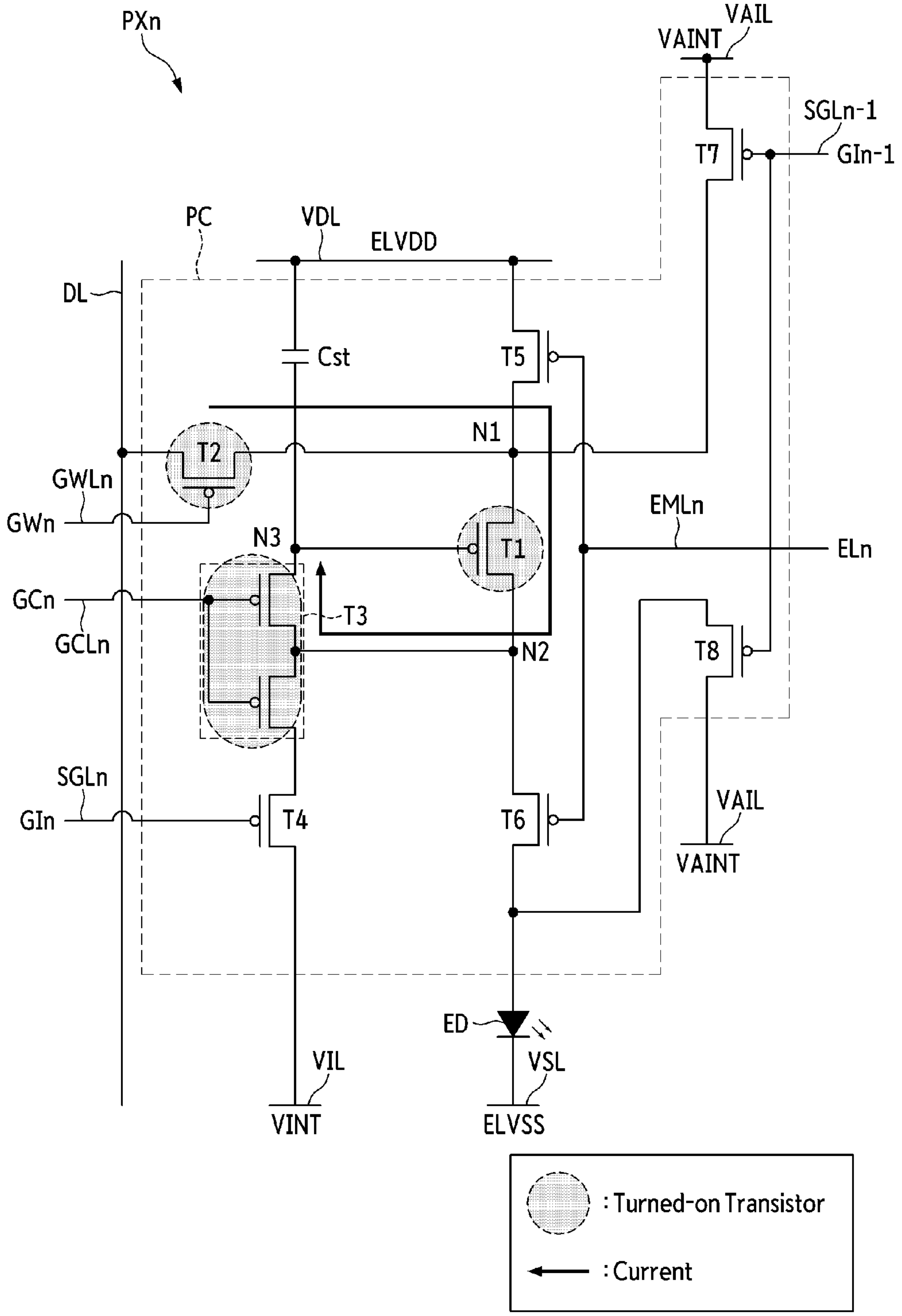
FIG. 10 is a diagram for explaining the operation of the pixel of FIG. 5 in a third period of FIG. 7.

FIG. 10 is a diagram for explaining the operation of the pixel of FIG. 5 in the third period P3 of FIG. 7.

As illustrated in FIG. 7, in the third period P3, the $n^{th}$ compensation gate signal GCn and the $n^{th}$ write gate signal GWn may each have an active level. On the other hand, in the third period P3, the $n^{th}$ emission signal ELn, the $n^{th}$ initialization gate signal GIn, and the previous $(n-1)^{th}$ initialization gate signal GIn−1 may each have a non-active level. In addition, in the third period P3, a data voltage may be provided to the data line DL.

The $n^{th}$ write gate signal GWn at the active level may be transmitted to the second gate electrode G2 of the second transistor T2 through the $n^{th}$ write gate line GWLn. Accordingly, the second transistor T2 may be turned on.

The $n^{th}$ compensation gate signal GGn at the active level may be transmitted to the third gate electrode G3 of the third transistor T3 through the $n^{th}$ compensation gate line GCLn. Accordingly, the third transistor T3 may be turned on.

The $n^{th}$ initialization gate signal GIn at the non-active level may be transmitted to the fourth gate electrode G4 of the fourth transistor T4 through the current $n^{th}$ initialization gate line SGLn. Accordingly, the fourth transistor T4 may be turned off.

The $n^{th}$ emission signal ELn at the non-active level may be transmitted to the fifth gate electrode G5 of the fifth transistor T5 and the sixth gate electrode G6 of the sixth transistor T6 through the $n^{th}$ emission line EMLn. Accordingly, the fifth transistor T5 and the sixth transistor T6 may be turned off.

The previous $(n-1)^{th}$ initialization gate signal GIn−1 at the non-active level may be transmitted to the seventh gate electrode G7 of the seventh transistor T7 through the previous $(n-1)^{th}$ initialization gate line SGLn−1. Accordingly, the seventh transistor T7 may be turned off.

As the third transistor T3 is turned on as described above, the first gate electrode G1 (e.g., the third node N3) and the first drain electrode D1 (e.g., the second node N2) of the first transistor T1 may be electrically connected to each other. In other words, the first transistor T1 may be connected to the pixel circuit PC in a diode form (e.g., the first transistor T1 may be diode-connected).

As the second transistor T2 is turned on as described above, the data voltage from the data line DL may be applied to the first source electrode S1 (e.g., the first node N1) of the first transistor T1 through the turned-on second transistor T2. The voltage of the first source electrode S1 of the first transistor T1 may be maintained at the data voltage in this way, but the voltage of the first gate electrode G1 (e.g., the third node N3) of the first transistor T1 may gradually increase. In other words, as a current generated by the data voltage applied to the first node N1 is supplied to the second node N2 and the third node N3 through the turned-on first transistor T1, the voltage of the first gate electrode G1 of the first transistor T1 may gradually increase. As the voltage of the first gate electrode G1 of the first transistor T1 gradually increases, the gate-source voltage (Vgs) of the first transistor T1 may gradually decrease. When the decreasing gate-source voltage of the first transistor T1 reaches the threshold voltage of the first transistor T1, the first transistor T1 may be turned off. Therefore, the threshold voltage of the first transistor T1 may be detected at the time when the first transistor T1 is turned off, and the detected threshold voltage may be reflected in the third node N3. For example, the voltage of the third node N3 at the time when the first transistor T1 is turned off may be a voltage obtained by subtracting the threshold voltage of the first transistor T1 from the data voltage. The voltage of the third node N3 (e.g., the data voltage−the threshold voltage of the first transistor T1) may be stored by the capacitor Cst and maintained for a certain period of time. Therefore, in the third period P3, the threshold voltage of the first transistor T1 may be detected and maintained while the data voltage is applied. Thus, in the third period P3, the voltage of the third node N3 may include the threshold voltage of the first transistor T1.

Next, the operation of a pixel PX in the fourth period P4 will be described as follows with reference to FIGS. 7 and 11.

Figure 11:
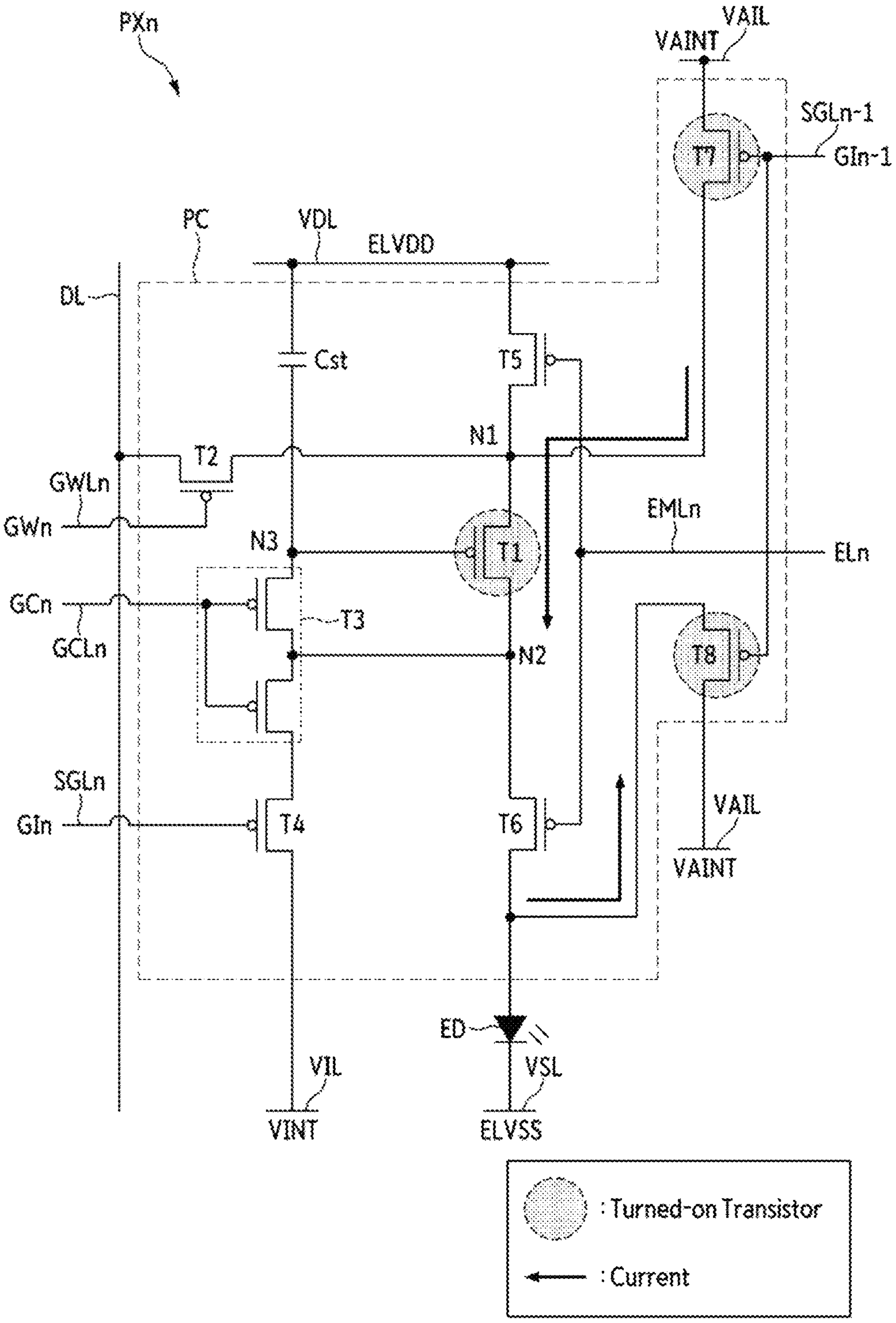
FIG. 11 is a diagram for explaining the operation of the pixel of FIG. 5 in a fourth period of FIG. 7.

FIG. 11 is a diagram for explaining the operation of the pixel of FIG. 5 in the fourth period P4 of FIG. 7.

As illustrated in FIG. 7, in the fourth period P4, the previous $(n-1)^{th}$ initialization gate signal GIn−1 may have an active level. On the other hand, in the fourth period P4, the $n^{th}$ emission signal ELn, the $n^{th}$ initialization gate signal GIn, the $n^{th}$ compensation gate signal GGn, and the $n^{th}$ write gate signal GWn may each have a non-active level.

The $(n-1)^{th}$ initialization gate signal GIn−1 at the active level may be transmitted to each of the seventh gate electrode G7 of the seventh transistor T7 and the eighth gate electrode G8 of the eighth transistor T8 through the $(n-1)^{th}$ initialization gate line SGLn−1. Accordingly, the seventh transistor T7 and the eighth transistor T8 may be turned on.

The $n^{th}$ write gate signal GWn at the non-active level may be transmitted to the second gate electrode G2 of the second transistor T2 through the $n^{th}$ write gate line GWLn. Accordingly, the second transistor T2 may be turned off.

The $n^{th}$ compensation gate signal GGn at the non-active level may be transmitted to the third gate electrode G3 of the third transistor T3 through the $n^{th}$ compensation gate line GCLn. Accordingly, the third transistor T3 may be turned off.

The $n^{th}$ initialization gate signal GIn at the non-active level may be transmitted to the fourth gate electrode G4 of the fourth transistor T4 through the $n^{th}$ initialization gate line SGLn. Accordingly, the fourth transistor T4 may be turned off.

The $n^{th}$ emission signal ELn at the non-active level may be transmitted to each of the fifth gate electrode G5 of the fifth transistor T5 and the sixth gate electrode G6 of the sixth transistor T6 through the $n^{th}$ emission line EMLn. Accordingly, the fifth transistor T5 and the sixth transistor T6 may be turned off.

As the seventh transistor T7 is turned on as described above, the emission initialization voltage VAINT from the emission initialization line VAIL may be applied to the first source electrode S1 (e.g., the first node N1) of the first transistor T1 through the turned-on seventh transistor T7. Accordingly, the voltage of the first source electrode S1 of the first transistor T1 may gradually increase, and thus the gate-source voltage (Vgs) of the first transistor T1 may become greater than the threshold voltage of the first transistor T1. Therefore, the first transistor T1 may be turned on. The emission initialization voltage VAINT from the emission initialization line VAIL may be applied to the first node N1 and the second node N2 through the turned-on first transistor T1. Here, the voltage of the second node N2 may be a difference voltage obtained by subtracting the threshold voltage of the first transistor T1 from the emission initialization volage VAINT. Accordingly, the hysteresis of the first transistor T1 can be improved in the fourth period P4. Therefore, even when a scanning rate of the display device 10 changes rapidly, the deviation of the driving current Ids flowing through the first transistor T1 can be reduced or minimized, thereby improving the image quality of the display device 10.

In addition, as the eighth transistor T8 is turned on by the previous $(n-1)^{th}$ initialization gate signal GIn−1 at the active level, the voltage of the anode of the light emitting element ED may be initialized to a voltage of the same magnitude as that of the emission initialization voltage VAINT of the emission initialization line VAIL. Because the voltage of the anode of the light emitting element ED is maintained low at the same voltage as the emission initialization voltage VAINT in the fourth period P4, even when a gray level of the data voltage changes rapidly from a white gray level to a black gray level, the light emitting element ED can be turned off at a sufficiently fast speed. Therefore, even when an image changes rapidly from the white gray level to the black gray level, an image corresponding to the black gray level can be accurately expressed. Therefore, the fourth period P4 may be a period for improving the expression of the black gray level by discharging the voltage applied to the first drain electrode D1 of the first transistor T1 and the anode of the light emitting element ED.

Next, the operation of a pixel PX in the fifth period P5 will be described as follows with reference to FIGS. 7 and 12.

Figure 12:
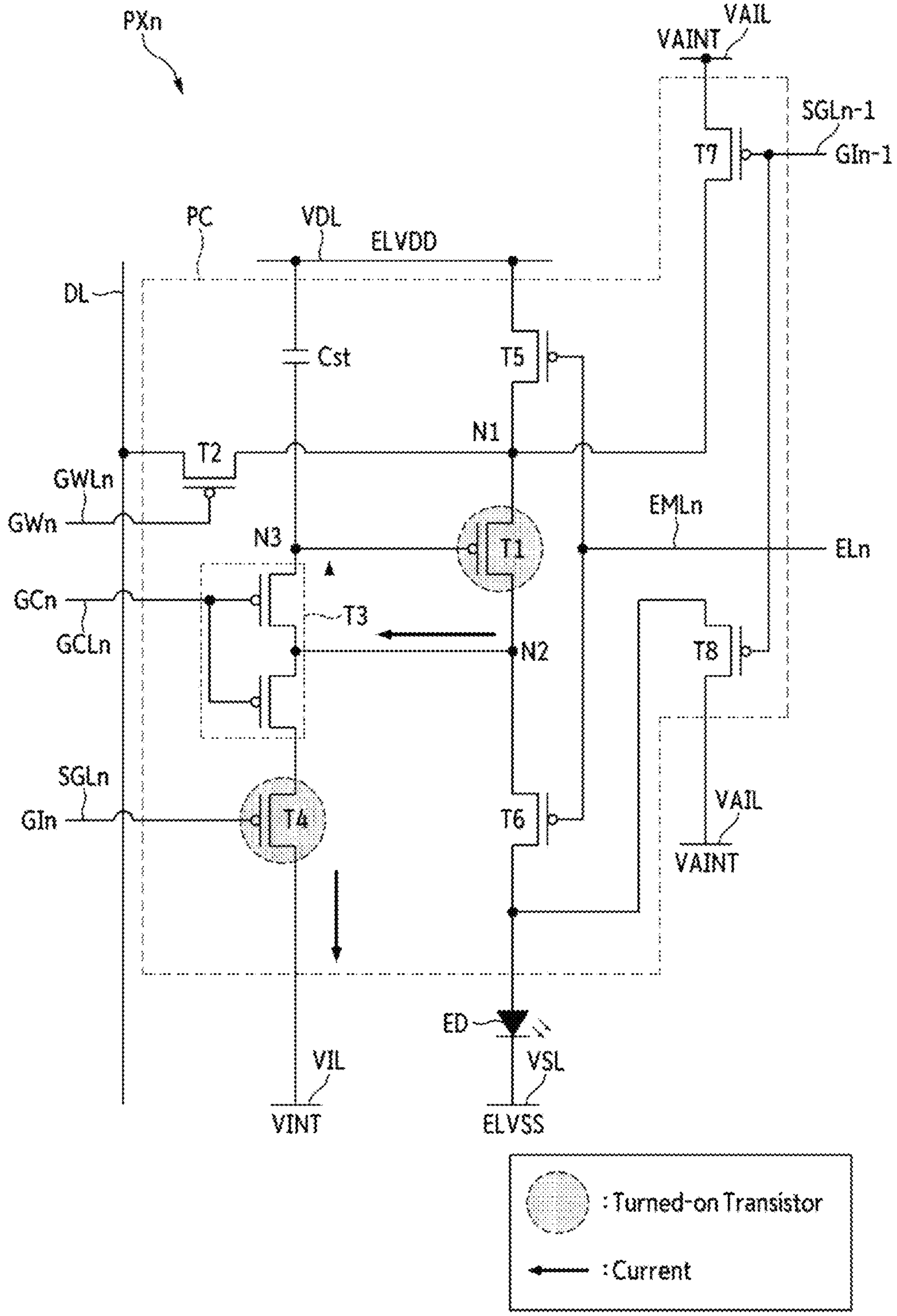
FIG. 12 is a diagram for explaining the operation of the pixel of FIG. 5 in a fifth period of FIG. 7.

FIG. 12 is a diagram for explaining the operation of the pixel of FIG. 5 in the fifth period P5 of FIG. 7.

As illustrated in FIG. 7, in the fifth period P5, the $n^{th}$ initialization gate signal GIn may be supplied at an active level. On the other hand, in the fifth period P5, the $n^{th}$ emission signal ELn, the $n^{th}$ compensation gate signal GGn, the $n^{th}$ write gate signal GWn, and the previous $(n-1)^{th}$ initialization gate signal GIn−1 may each be supplied at a non-active level.

The $n^{th}$ initialization gate signal GIn at the active level may be transmitted to the fourth gate electrode G4 of the fourth transistor T4 through the $n^{th}$ initialization gate line SGLn. Accordingly, the fourth transistor T4 may be turned on.

The $n^{th}$ write gate signal GWn at the non-active level may be transmitted to the second gate electrode G2 of the second transistor T2 through the $n^{th}$ write gate line GWLn. Accordingly, the second transistor T2 may be turned off.

The $n^{th}$ compensation gate signal GGn at the non-active level may be transmitted to the third gate electrode G3 of the third transistor T3 through the $n^{th}$ compensation gate line GCLn. Accordingly, the third transistor T3 may be turned off.

The $n^{th}$ emission signal ELn at the non-active level may be transmitted to each of the fifth gate electrode G5 of the fifth transistor T5 and the sixth gate electrode G6 of the sixth transistor T6. Accordingly, the fifth transistor T5 and the sixth transistor T6 may be turned off.

The previous $(n-1)^{th}$ initialization gate signal GIn−1 at the non-active level may be transmitted to each of the seventh gate electrode G7 of the seventh transistor T7 and the eighth gate electrode G8 of the eighth transistor T8 through the $(n-1)^{th}$ initialization gate line SGLn−1. Accordingly, the seventh transistor T7 and the eighth transistor T8 may be turned off by the previous $(n-1)^{th}$ initialization gate signal GIn−1.

As the fourth transistor T4 is turned on as described above, the initialization voltage VINT from the initialization voltage line VIL may be applied to the first drain electrode D1 (e.g., the second node N2) of the first transistor T1 through the turned-on fourth transistor T4. Accordingly, the voltage of the first drain electrode D1 of the first transistor T1 may be changed to the initialization voltage VINT. Accordingly, the voltage of the second node N2 may be maintained low during the fifth period P5. Because the voltage of the second node N2 is maintained low at the same voltage as the initialization voltage VINT during the fifth period P5, even when the gray level of the data voltage changes rapidly from a white gray level to a black gray level, the light emitting element ED can be turned off at a sufficiently fast speed in a next period (e.g., the sixth period P6). Therefore, even when an image changes rapidly from the white gray level to the black gray level, an image corresponding to the black gray level can be accurately expressed.

In other words, in order to improve the hysteresis of the first transistor T1 described above, the second node N2 must be maintained at a high voltage (e.g., the initialization voltage−the threshold voltage of the first transistor T1) in a previous period (e.g., the third period P3). In this case, it may be difficult to normally express the black gray level when the gray level changes from the white gray level to the black gray level. To solve this problem, the voltage of the second node N2 may be changed to a low voltage (e.g., the initialization voltage VINT) in advance in the fifth period P5 prior to an emission period (e.g., the sixth period P6).

Next, the operation of a pixel PX in the sixth period P6 will be described as follows with reference to FIGS. 7 and 13.

Figure 13:
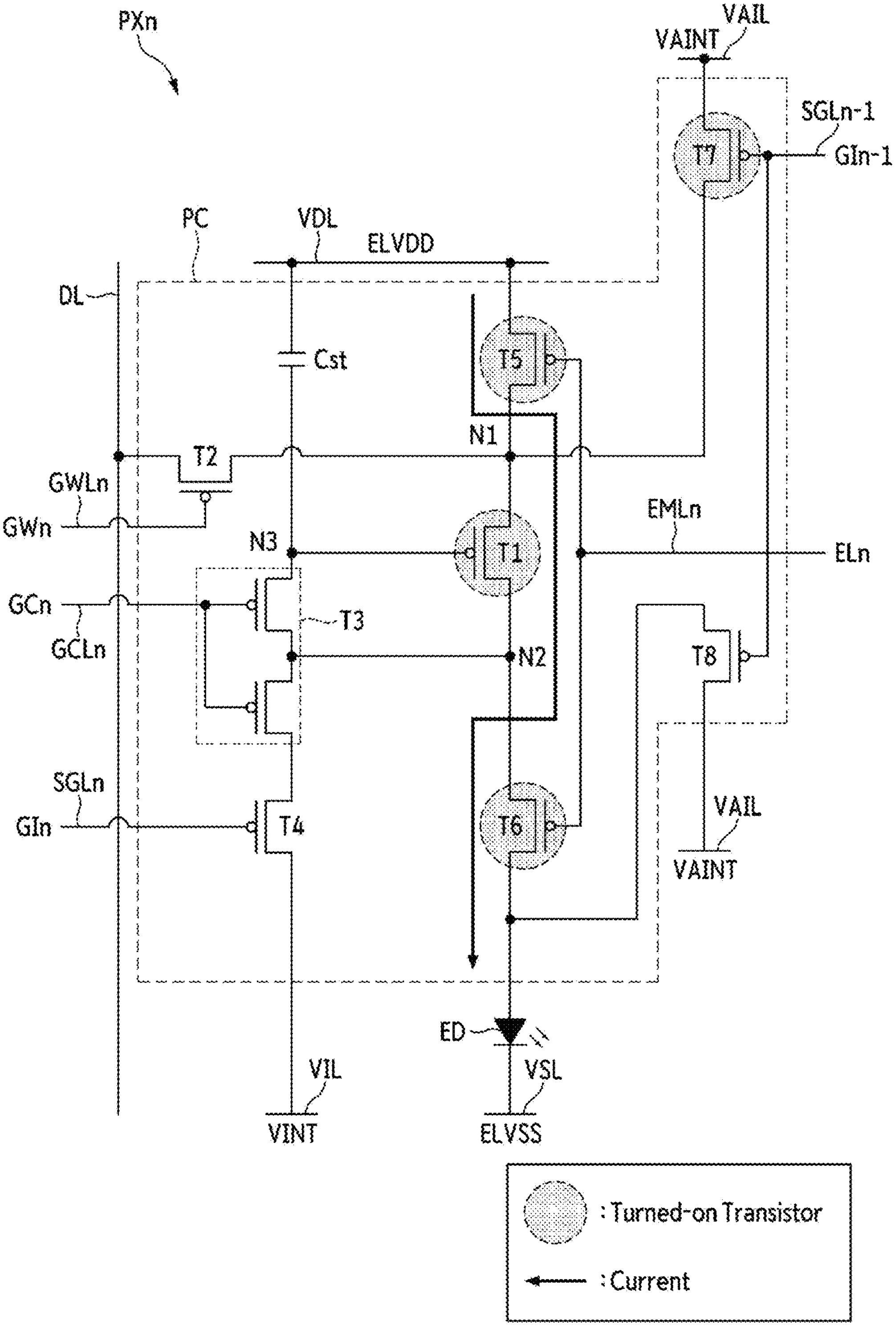
FIG. 13 is a diagram for explaining the operation of the pixel of FIG. 5 in a sixth period of FIG. 7.

FIG. 13 is a diagram for explaining the operation of the pixel of FIG. 5 in the sixth period P6 of FIG. 7.

As illustrated in FIG. 7, in the sixth period P6, the $n^{th}$ emission signal ELn may be supplied at an active level through the $n^{th}$ emission line EMLn. On the other hand, in the sixth period P6, the $n^{th}$ initialization gate signal GIn, the $n^{th}$ compensation gate signal GCn, the $n^{th}$ write gate signal GWn, and the previous $(n-1)^{th}$ initialization gate signal GIn−1 may each be supplied at a non-active level.

The $n^{th}$ emission signal ELn at the active level may be transmitted to each of the fifth gate electrode G5 of the fifth transistor T5 and the sixth gate electrode G6 of the sixth transistor T6 through the $n^{th}$ emission line EMLn. Accordingly, the fifth transistor T5 and the sixth transistor T6 may be turned on.

The $n^{th}$ write gate signal GWn at the non-active level may be transmitted to the second gate electrode G2 of the second transistor T2 through the $n^{th}$ write gate line GWLn. Accordingly, the second transistor T2 may be turned off.

The $n^{th}$ compensation gate signal GCn at the non-active level may be transmitted to the third gate electrode G3 of the third transistor T3 through the $n^{th}$ compensation gate line GCLn. Accordingly, the third transistor T3 may be turned off.

The $n^{th}$ initialization gate signal GIn at the non-active level may be transmitted to the fourth gate electrode G4 of the fourth transistor T4 through the $n^{th}$ initialization gate line SGLn. Accordingly, the fourth transistor T4 may be turned off.

The previous $(n-1)^{th}$ initialization gate signal GIn−1 may be transmitted to the seventh gate electrode G7 of the seventh transistor T7 through the $(n-1)^{th}$ initialization gate line SGLn−1. Accordingly, the seventh transistor T7 may be turned off.

In one or more embodiments, the first transistor T1 may be kept turned on by the gate-source voltage (Vgs) maintained by the capacitor Cst.

In the sixth period P6, as the first transistor T1, the fifth transistor T5, and the sixth transistor T6 are turned on, the driving current Ids may be supplied to the light emitting element ED through the turned-on first transistor T1, fifth transistor T5 and sixth transistor T6. Therefore, the light emitting element ED may emit light according to the driving current Ids. Here, the gate-source voltage (Vgs) maintained by the capacitor Cst includes the threshold voltage of the first transistor T1. Thus, the magnitude of the driving current Ids flowing to the light emitting element ED through the turned-on first transistor T1 may be determined based on the data voltage and the threshold voltage of the first transistor T1. Therefore, the driving current Ids supplied to the light emitting element ED may accurately reflect the magnitude of the data voltage. In this way, because the driving current Ids of each pixel PX is determined by compensating for different threshold voltages of the first transistors T1 of the pixels PX, a difference in luminance between the pixels PX due to a difference in threshold voltage between the first transistors T1 of the pixels PX can be reduced or minimized. Therefore, the image quality of the display device 10 can be improved.

According to one or more embodiments, because the voltage of the second node N2 is discharged to the initialization voltage VINT and thus maintained at a low voltage in a previous period (e.g., the fifth period P5), a voltage difference between the anode of the light emitting element ED (e.g., the anode connected to the sixth source electrode S6 of the sixth transistor T6) and the cathode of the light emitting element ED may be maintained small in the sixth period P6. In other words, the voltage of the anode of the light emitting element ED may be kept sufficiently low during the sixth period P6. Therefore, as described above, even when the gray level of the data voltage changes rapidly from a white gray level to a black gray level in adjacent frame periods, the voltage of the anode of the light emitting element ED can be lowered at fast speed. Therefore, an image of the black gray level can be accurately expressed.

On the other hand, when the gray level changes from the black gray level to the white gray level, because the first transistor T1 is already turned on by the data voltage of the white gray level to allow a large amount of current to flow, the voltage of the anode of the light emitting element ED can be increased sufficiently rapidly from the black gray level to a large voltage corresponding to the white gray level even in a state where the voltage of the second node N2 is discharged to a low voltage such as the initialization voltage VINT. Therefore, the image quality of the display device 10 can be improved. In addition, because the black gray level can be improved in this way, a swing width of the data voltage can be reduced, thereby improving the power consumption of the display device 10.

In addition, according to one or more embodiments, because the fourth transistor T4 is disposed between the first drain electrode D1 of the first transistor T1 and the initialization voltage line VIL, a voltage difference between the voltage of the first drain electrode D1 of the first transistor T1 and the initialization voltage VINT is small. Therefore, a leakage current (e.g., an off leakage current) of the fourth transistor T4 can be reduced or minimized. Accordingly, an image can be displayed without flicker even when the display device 10 is driven at a low frequency.

Figure 14:
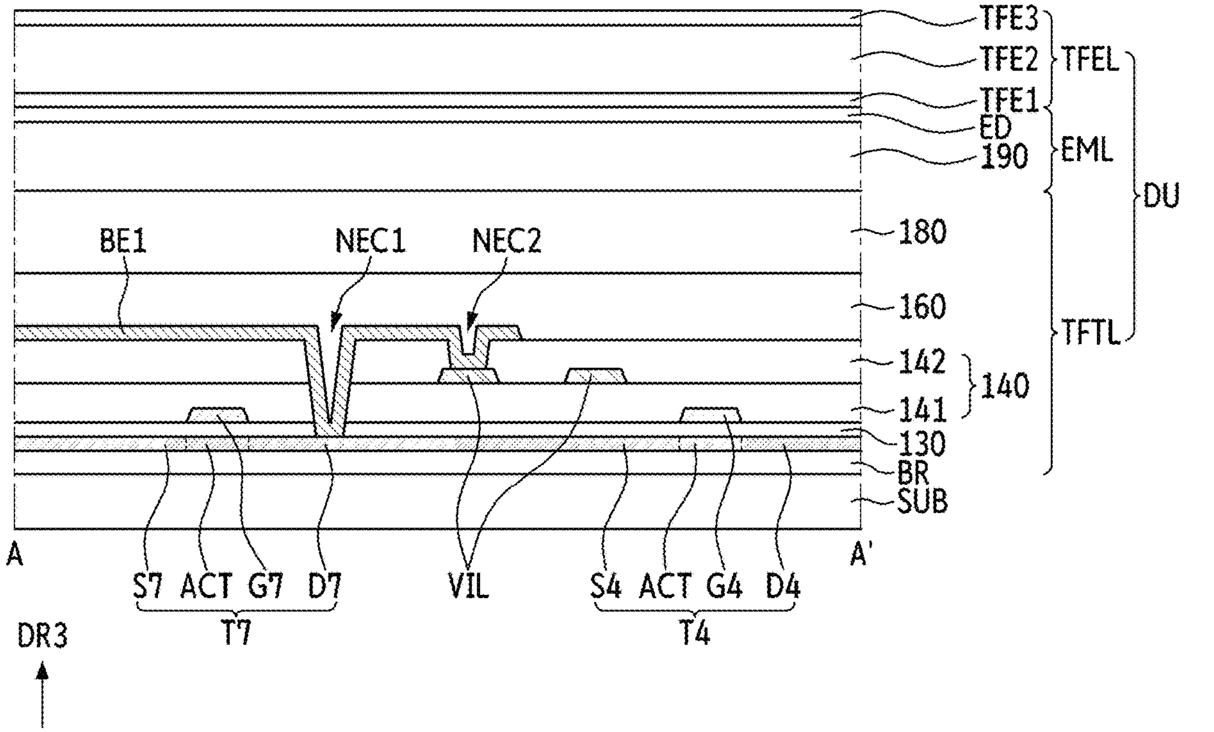
FIG. 14 is a cross-sectional view taken along the line A-A' of FIG. 6.

FIG. 14 is a cross-sectional view taken along the line A-A' of FIG. 6.

Referring to FIG. 14, a barrier layer BR may be disposed on the substrate SUB. The substrate SUB may be made of an insulating material such as polymer resin. For example, the substrate SUB may be made of polyimide. The substrate SUB may be a flexible substrate that can be bent, folded, rolled, etc.

The barrier layer BR is a layer for protecting transistors of the thin-film transistor layer TFTL and light emitting layers of the light emitting element layer EML from moisture introduced through the substrate SUB which is vulnerable to moisture penetration. The barrier layer BR may be composed of a plurality of inorganic layers stacked alternately. For example, the barrier layer BR may be a multilayer in which one or more inorganic layers selected from a silicon nitride layer, a silicon oxynitride layer, a silicon oxide layer, a titanium oxide layer, and/or an aluminum oxide layer are alternately stacked.

The thin-film transistors T1 through T8 may be disposed on the barrier layer BR. For example, as illustrated in FIG. 14, the fourth thin-film transistor T4 and the seventh thin-film transistor T7 may be formed on the barrier layer BR. The fourth thin-film transistor T4 includes an active layer ACT, the fourth gate electrode G4, the fourth source electrode S4, and the fourth drain electrode D4. In addition, the seventh thin-film transistor T7 includes an active layer ACT, the seventh gate electrode G7, the seventh source electrode S7, and the seventh drain electrode D7.

For example, the active layers ACT of the fourth thin-film transistor T4 and the seventh thin-film transistor T7 include polycrystalline silicon, monocrystalline silicon, low-temperature polycrystalline silicon, amorphous silicon, and/or an oxide semiconductor. The active layers ACT overlapped by the gate electrodes G4 and G7 in the third direction DR3 (Z-axis direction) which is a thickness direction of the substrate SUB may be defined as channel regions. The fourth and seventh source electrodes S4 and S7 and the fourth and seventh drain electrodes D4 and D7 of the fourth and seventh thin-film transistors T4 and T7 are regions not overlapped by the fourth and seventh gate electrodes G4 and G7 in the third direction DR3 (Z-axis direction) and may be formed to have conductivity by doping a silicon semiconductor or an oxide semiconductor with ions and/or impurities.

A gate insulating layer 130 may be disposed on the active layers ACT, source electrodes and drain electrodes of the thin-film transistors including the fourth and seventh thin-film transistors T4 and T7. The gate insulating layer 130 may be an inorganic layer, for example, a silicon nitride layer, a silicon oxynitride layer, a silicon oxide layer, a titanium oxide layer, and/or an aluminum oxide layer.

The gate electrodes of the thin-film transistors may be disposed on the gate insulating layer 130. For example, the fourth gate electrode G4 of the fourth thin-film transistor T4 and the seventh gate electrode G7 of the seventh thin-film transistor T7 may overlap the active layers ACT in the third direction DR3 (Z-axis direction). Each of the fourth and seventh gate electrodes G4 and G7 may be a single layer or a multilayer made of molybdenum (Mo), aluminum (Al), chromium (Cr), gold (Au), titanium (Ti), nickel (Ni), neodymium (Nd), copper (Cu), and/or alloys thereof.

A first interlayer insulating layer 141 may be disposed on the entire surfaces of the thin-film transistors including the fourth and seventh thin-film transistors T4 and T7 and the gate insulating layer 130. The first interlayer insulating layer 141 may be an inorganic layer, for example, a silicon nitride layer, a silicon oxynitride layer, a silicon oxide layer, a titanium oxide layer, and/or an aluminum oxide layer. The first interlayer insulating layer 141 may be composed of a plurality of inorganic layers.

The initialization voltage lines VIL may be patterned and formed on the first interlayer insulating layer 141. The initialization voltage line VIL may be a single layer or a multilayer made of molybdenum (Mo), aluminum (Al), chromium (Cr), gold (Au), titanium (Ti), nickel (Ni), neodymium (Nd), copper (Cu), and/or alloys thereof.

A second interlayer insulating layer 142 may be disposed on the entire surface of the first interlayer insulating layer 141 including the initialization voltage line VIL. The second interlayer insulating layer 142 may be an inorganic layer, for example, a silicon nitride layer, a silicon oxynitride layer, a silicon oxide layer, a titanium oxide layer, and/or an aluminum oxide layer. The second interlayer insulating layer 142 may be composed of a plurality of inorganic layers.

First connection electrodes BE1 may be disposed on the second interlayer insulating layer 142. A side of each of the first connection electrodes BE1 may be electrically connected to the seventh drain electrode D7 of the seventh thin-film transistor T7 through a first connection contact hole NEC1 penetrating the gate insulating layer 130, the first interlayer insulating layer 141, and the second interlayer insulating layer 142. In addition, the other side of each of the first connection electrodes BE1 may be electrically connected to the initialization voltage line VIL through a second connection contact hole NEC2 penetrating the second interlayer insulating layer 142. Here, each of the first connection electrodes BE1 may be a single layer or a multilayer made of molybdenum (Mo), aluminum (Al), chromium (Cr), gold (Au), titanium (Ti), nickel (Ni), neodymium (Nd), copper (Cu), and/or alloys thereof.

A first planarization layer 160 may be disposed on the entire surface of the second interlayer insulating layer 142 including the first connection electrodes BE1 to flatten steps due to the first connection electrodes BE1. The first planarization layer 160 may be an organic layer such as acryl resin, epoxy resin, phenolic resin, polyamide resin, and/or polyimide resin.

In one or more embodiments, a plurality of anode connection electrodes may be additionally formed on the first planarization layer 160 and connected to the first connection electrodes BE1, etc. through connection contact holes penetrating the first planarization layer 160.

A second planarization layer 180 may be disposed on the first planarization layer 160 including the anode connection electrodes. The second planarization layer 180 may be an organic layer such as acryl resin, epoxy resin, phenolic resin, polyamide resin, and/or polyimide resin.

The light emitting element layer EML including light emitting elements ED and a bank 190 may be disposed on the second planarization layer 180. Each of the light emitting elements ED includes a pixel electrode, a light emitting layer, and a common electrode. The bank 190 may be formed on the second planarization layer 180 to separate the pixel electrodes so as to define areas where the light emitting elements ED are formed. The bank 190 may be an organic layer such as acryl resin, epoxy resin, phenolic resin, polyamide resin, and/or polyimide resin.

The encapsulation layer TFEL may be disposed on the entire surface of the light emitting element layer EML. The encapsulation layer TFEL includes at least one inorganic layer to prevent oxygen and/or moisture from permeating into the light emitting element layer EML. In addition, the encapsulation layer TFEL includes at least one organic layer to protect the light emitting element layer EML from foreign substances such as dust. For example, the encapsulation layer TFEL includes a first encapsulating inorganic layer TFE1, an encapsulating organic layer TFE2, and a second encapsulating inorganic layer TFE3.

The first encapsulating inorganic layer TFE1 may be disposed on the common electrode of the light emitting element layer EML, the encapsulating organic layer TFE2 may be disposed on the first encapsulating inorganic layer TFE1, and the second encapsulating inorganic layer TFE3 may be disposed on the encapsulating organic layer TFE2. Each of the first encapsulating inorganic layer TFE1 and the second encapsulating inorganic layer TFE3 may be a multilayer in which one or more inorganic layers selected from a silicon nitride layer, a silicon oxynitride layer, a silicon oxide layer, a titanium oxide layer, and/or an aluminum oxide layer are alternately stacked. The encapsulating organic layer TFE2 may be an organic layer such as acryl resin, epoxy resin, phenolic resin, polyamide resin, and/or polyimide resin.

Figure 15:
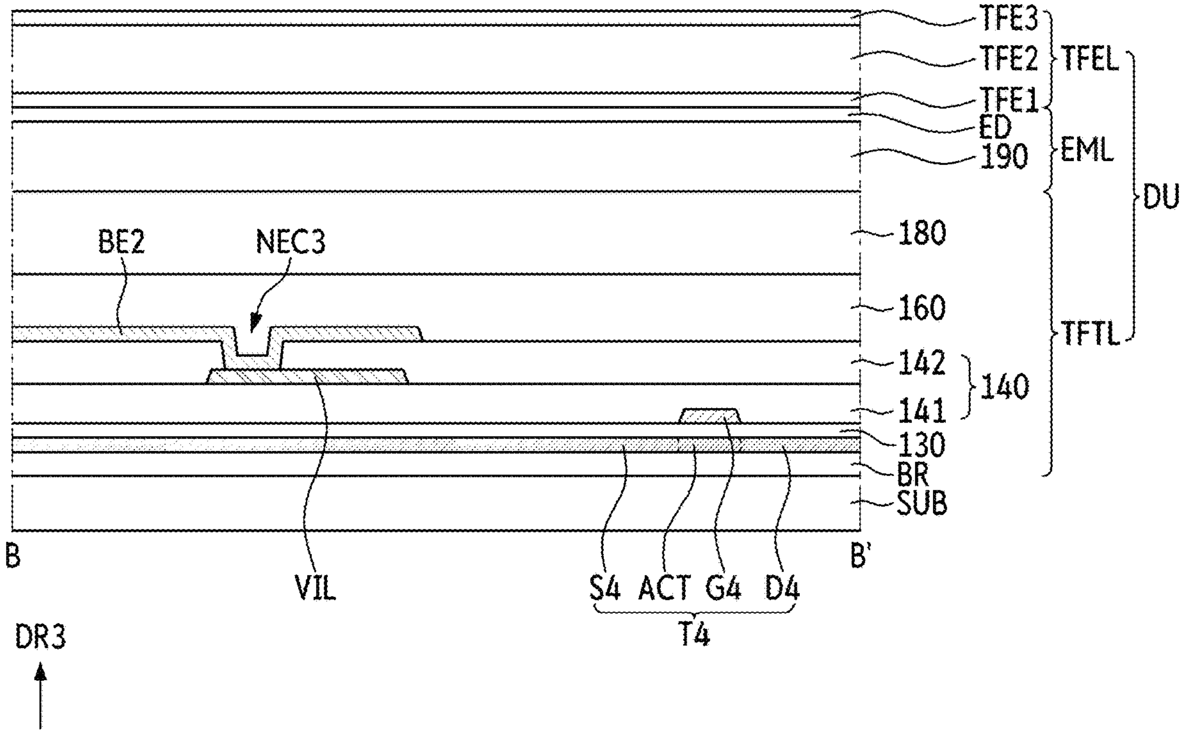
FIG. 15 is a cross-sectional view taken along line B-B' of FIG. 6.

FIG. 15 is a cross-sectional view taken along the line B-B' of FIG. 6.

Referring to FIG. 15, the fourth thin-film transistor T4 may be formed on the barrier layer BR. The fourth thin-film transistor T4 includes the active layer ACT, the fourth gate electrode G4, the fourth source electrode S4, and the fourth drain electrode D4.

The active layer ACT of the fourth thin-film transistor T4 includes polycrystalline silicon, monocrystalline silicon, low-temperature polycrystalline silicon, amorphous silicon, and/or an oxide semiconductor. The active layer ACT overlapped by the fourth gate electrode G4 may be defined as a channel region. The fourth source electrode S4 and the fourth drain electrode D4 of the fourth thin-film transistor T4 are regions not overlapped by the fourth gate electrodes G4 in the third direction DR3 (Z-axis direction) and may be formed to have conductivity by doping a silicon semiconductor or an oxide semiconductor with ions and/or impurities.

The gate insulating layer 130 is disposed on the active layer ACT, the fourth source electrode S4, and the fourth drain electrode D4 of the fourth thin-film transistor T4. In addition, the fourth gate electrode G4 may be disposed on the gate insulating layer 130. For example, the fourth gate electrode G4 of the fourth thin-film transistor T4 may overlap the active layer ACT in the third direction DR3 (Z-axis direction). The fourth gate electrode G4 may be a single layer or a multilayer made of molybdenum (Mo), aluminum (Al), chromium (Cr), gold (Au), titanium (Ti), nickel (Ni), neodymium (Nd), copper (Cu), and/or alloys thereof.

The first interlayer insulating layer 141 may be disposed on the entire surface of the thin-film transistors including the fourth thin-film transistor T4. The initialization voltage line VIL is patterned and disposed on the first interlayer insulating layer 141. The second interlayer insulating layer 142 may be disposed on the entire surface of the first interlayer insulating layer 141 including the initialization voltage line VIL.

Second connection electrodes BE2 may be disposed on the second interlayer insulating layer 142. A side of each of the second connection electrodes BE2 may be electrically connected to the initialization voltage line VIL through a third connection contact hole NEC3 penetrating the second interlayer insulating layer 142. Here, each of the second connection electrodes BE2 may be a single layer or a multilayer made of molybdenum (Mo), aluminum (Al), chromium (Cr), gold (Au), titanium (Ti), nickel (Ni), neodymium (Nd), copper (Cu), and/or alloys thereof.

The first planarization layer 160 may be disposed on the entire surface of the second interlayer insulating layer 142 including the second connection electrodes BE2 to flatten steps due to the fourth thin-film transistor T4. A description of the first and second planarization layers 160 and 180, the light emitting element layer EML, the encapsulation layer TFEL, etc. will be replaced with the description of FIG. 14.

Figure 16:
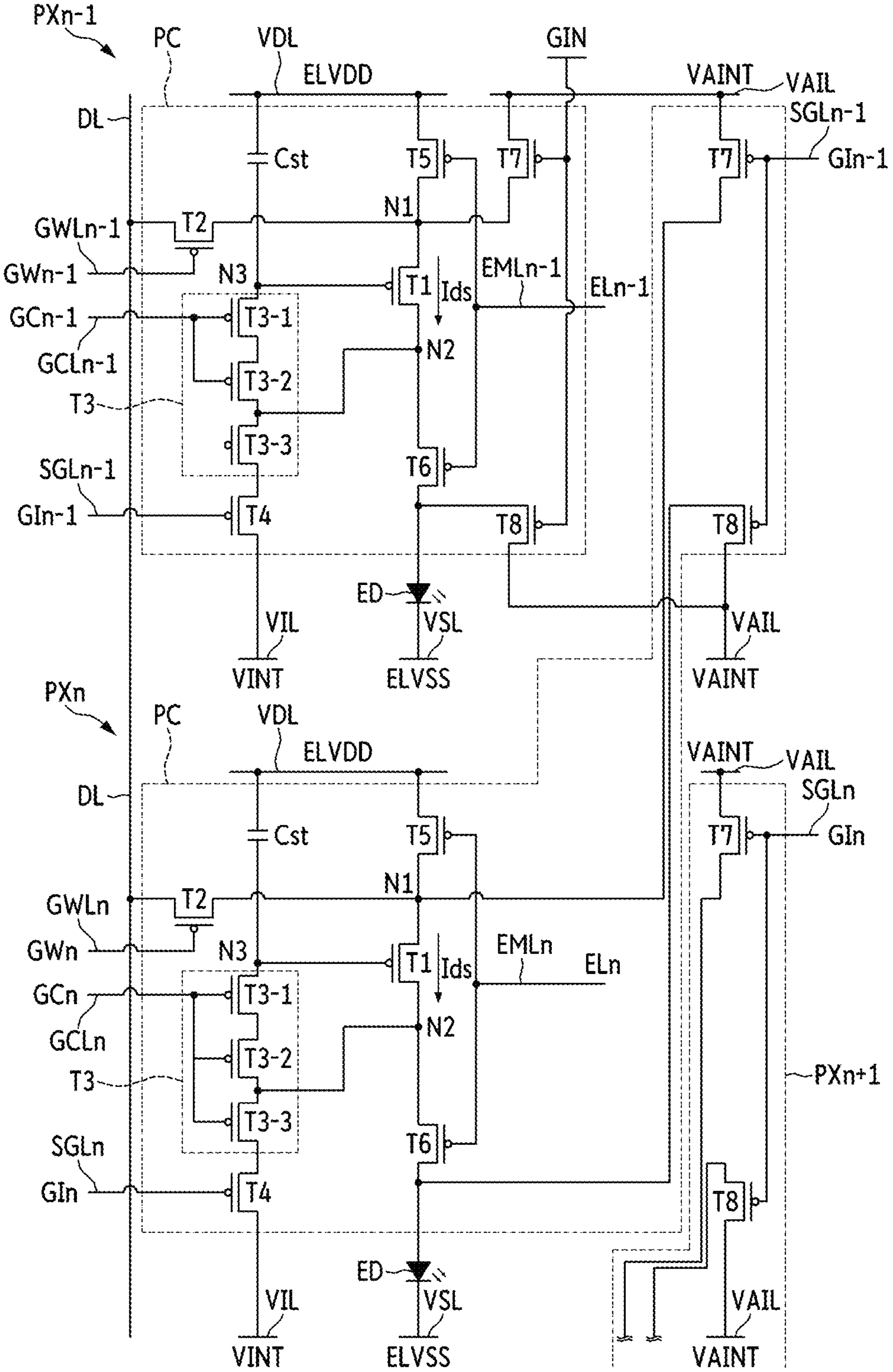
FIG. 16 is a circuit diagram of a pixel of a display device according to a second embodiment.
Figure 17:
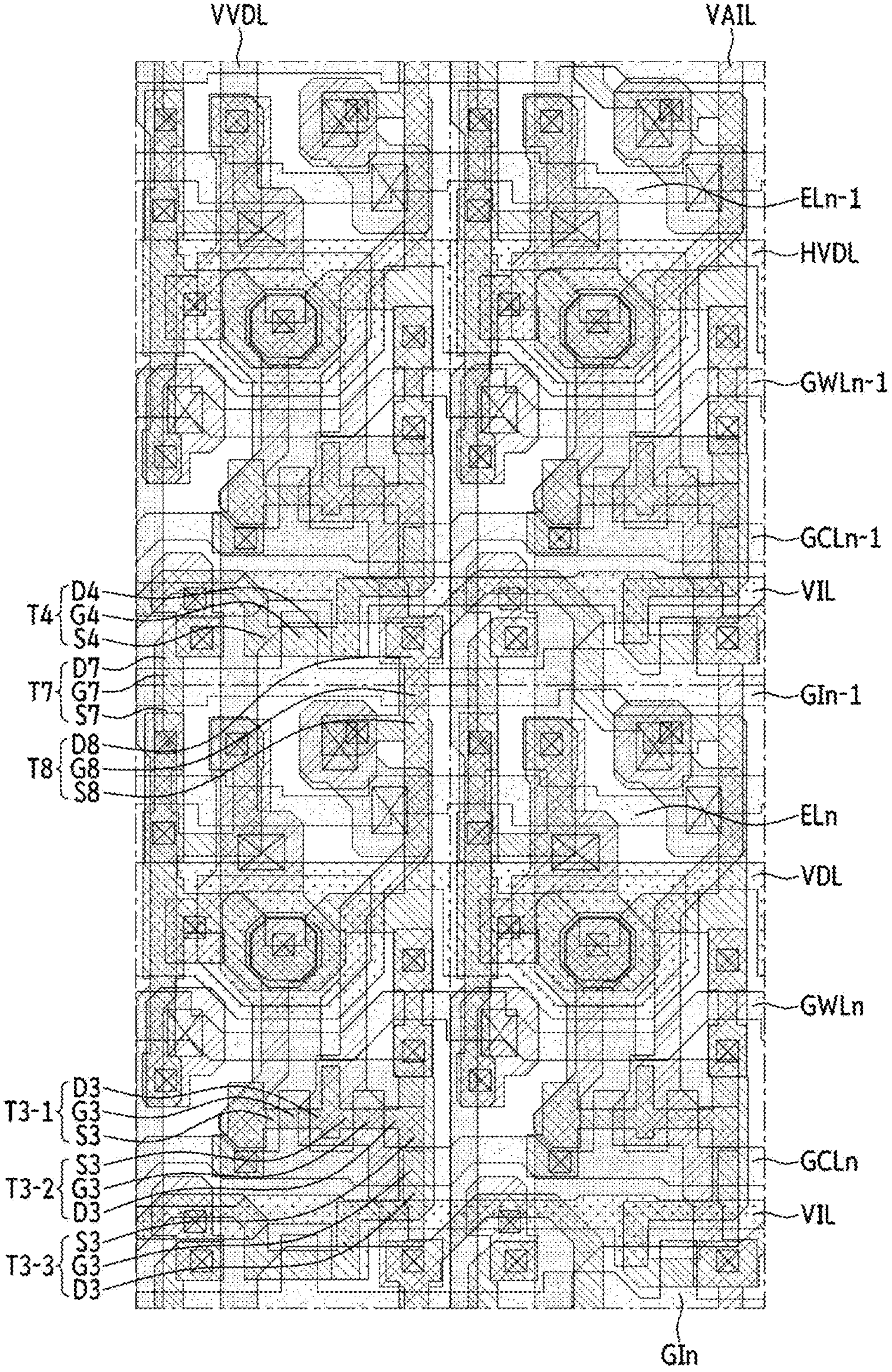
FIG. 17 is a detailed plan layout view of the adjacent pixels according to the second embodiment.

FIG. 16 is a circuit diagram of a pixel of a display device according to a second embodiment. FIG. 17 is a detailed plan layout view of the adjacent pixels according to the second embodiment.

Referring to FIGS. 16 and 17, in the pixel circuit structure of an $n^{th}$ pixel PXn, i.e., each $n^{th}$ pixel PXn according to the second embodiment, the structural characteristics of a third transistor T3 are different from the structural characteristics of the third transistor T3 of the first embodiment.

Specifically, the third transistor T3 may be formed in a triple-gate transistor structure in which a $(3\text{-}1)^{th}$ transistor T3-1, a $(3\text{-}2)^{th}$ transistor T3-2 and a $(3\text{-}3)^{th}$ transistor T3-3 are connected and disposed in a parallel structure to an $n^{th}$ compensation gate line GCLn.

The third transistor T3 having the triple-gate transistor structure may be turned on by an $n^{th}$ compensation gate signal GCn from the $n^{th}$ compensation gate line GCLn to electrically connect a second node N2, which is the first drain electrode D1 of the first transistor T1 and a third node N3 which is a first gate electrode G1 of the first transistor T1. To this end, the third transistor T3 (e.g., T3-1 and T3-2) may be connected between the third node N3 and the second node N2.

Specifically, a third gate electrode G3 of the third transistor T3 may be electrically connected to the $n^{th}$ compensation gate line GCLn, a third source electrode S3 of one of the $(3\text{-}1)^{th}$ transistor T3-1, the $(3\text{-}2)^{th}$ transistor T3-2, or the $(3\text{-}3)^{th}$ transistor T3-3 may be electrically connected to the second node N2, and a third drain electrode D3 may be electrically connected to the third node N3. Accordingly, the third transistor T3 may be turned on by the $n^{th}$ compensation gate signal GCn of a gate-on voltage magnitude input from the $n^{th}$ compensation gate line GCLn to electrically connect the second node N2, which is the first drain electrode D1 of the first transistor T1 and the third node N3, which is the first gate electrode G1 of the first transistor T1. In one or more embodiments, the source electrode of the $(3\text{-}3)^{th}$ transistor T3-3 may be connected to the fourth transistor T4 and the drain electrode of the $(3\text{-}3)^{th}$ transistor T3-3 may be connected to the second node N2.

Figure 18:
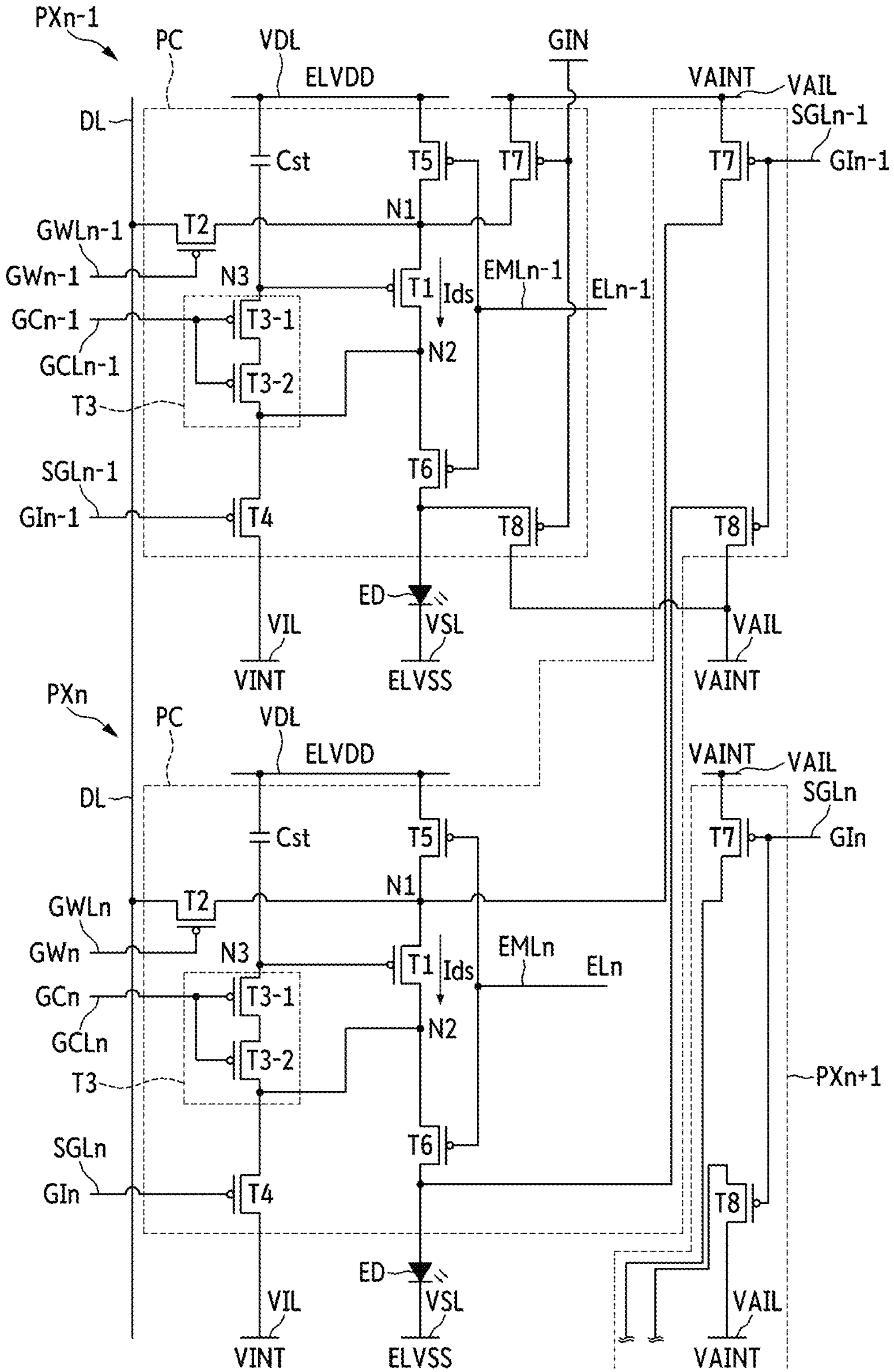
FIG. 18 is a circuit diagram of a pixel of a display device according to a third embodiment.

FIG. 18 is a circuit diagram of a pixel of a display device according to a third embodiment.

Figure 19:
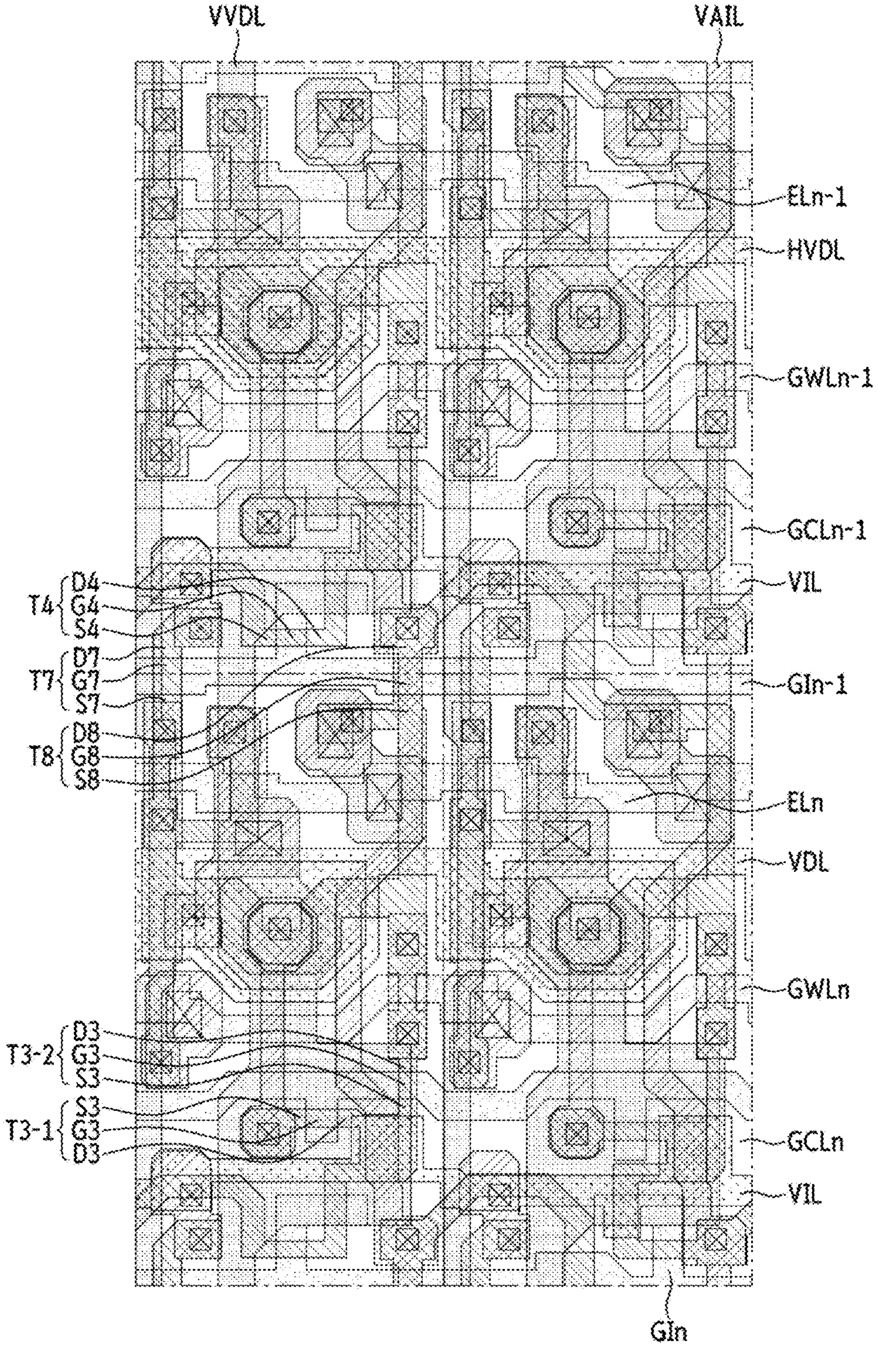
FIG. 19 is a detailed plan layout view of the adjacent pixels according to the third embodiment.

FIG. 19 is a detailed plan layout view of the adjacent pixels according to the third embodiment.

Referring to FIGS. 18 and 19, in the pixel circuit structure of an $n^{th}$ pixel PXn, i.e., each $n^{th}$ pixel PXn according to the third embodiment, the structural characteristics of a third transistor T3 are different from the structural characteristics of the third transistors T3 of the first and second embodiments.

Specifically, the third transistor T3 may be configured in a dual-gate transistor structure having two gate electrodes. Here, the third transistor T3 may be formed in a dual-gate transistor structure in which a $(3\text{-}1)^{th}$ transistor T3-1 and a $(3\text{-}2)^{th}$ transistor T3-2 are connected and disposed in a parallel structure to an $n^{th}$ compensation gate line GCLn.

The third transistor T3 may be connected in a parallel structure to the $n^{th}$ compensation gate line GCLn and may be connected between a third node N3 and a second node N2. Accordingly, the third transistor T3 may be turned on by an $n^{th}$ compensation gate signal GCn from the $n^{th}$ compensation gate line GCLn to electrically connect the second node N2, which is the first drain electrode D1 of the first transistor T1 and the third node N3, which is the first gate electrode G1 of the first transistor T1.

Specifically, a third gate electrode G3 of the third transistor T3, which is a dual-gate electrode may be connected in a parallel structure to the $n^{th}$ compensation gate line GCLn, a third source electrode S3 of the $(3\text{-}2)^{th}$ transistor T3-2 from among the $(3\text{-}1)^{th}$ transistor T3-1 and the $(3\text{-}2)^{th}$ transistor T3-2 connected in a parallel structure to the $n^{th}$ compensation gate line GCLn may be electrically connected to the second node N2, and a third drain electrode D3 may be electrically connected to the third node N3. The third transistor T3 may be turned on by the $n^{th}$ compensation gate signal GCn of a gate-on voltage magnitude input from the $n^{th}$ compensation gate line GCLn to electrically connect the second node N2, which is the first drain electrode D1 of the first transistor T1 and the third node N3, which is the first gate electrode G1 of the first transistor T1.

Figure 20:
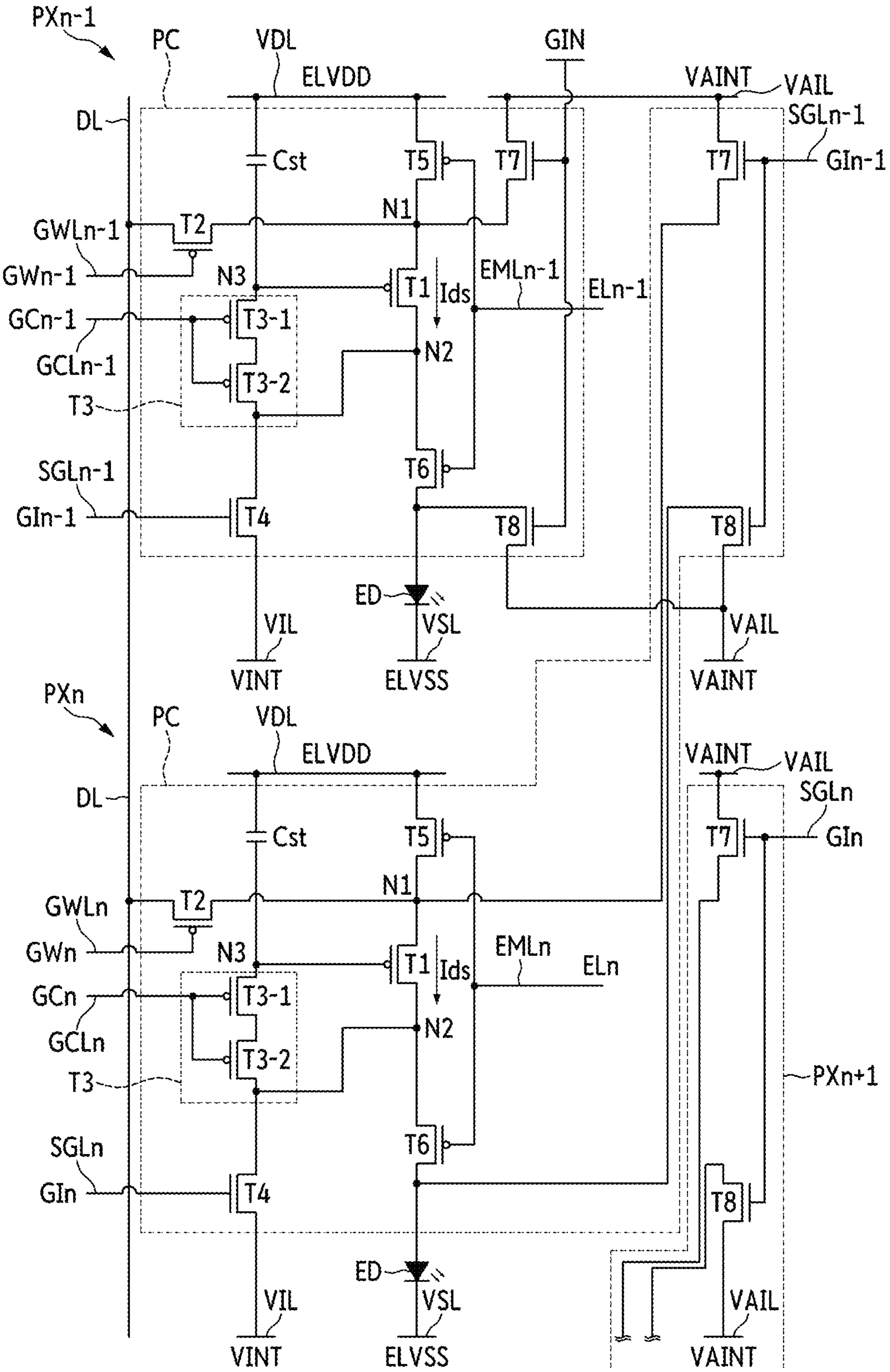
FIG. 20 is a circuit diagram of a pixel of a display device according to a fourth embodiment.

FIG. 20 is a circuit diagram of a pixel of a display device according to a fourth embodiment.

Referring to FIG. 20, first through third transistors T1 through T3 and fifth and sixth transistors T5 and T6 may each include a silicon-based active layer. For example, each of the first through third transistors T1 through T3 and the fifth and sixth transistors T5 and T6 may be a p-type transistor including an active layer made of low-temperature polycrystalline silicon (LTPS). The active layer made of low-temperature polycrystalline silicon may have high electron mobility and excellent turn-on characteristics. Therefore, a display device 10 including the transistors with excellent turn-on characteristics can stably and efficiently drive a plurality of pixels PXn. Each of the first through third transistors T1 through T3 and the fifth and sixth transistors T5 and T6 may output a current, which flows into a source electrode, to a drain electrode based on a gate-low voltage applied to a gate electrode.

On the other hand, each of a fourth transistor T4 and seventh and eighth transistors T7 and T8 may be an n-type transistor including an oxide-based active layer. A transistor including an oxide-based active layer may have a coplanar structure in which a gate electrode is disposed at the top. The transistor including the oxide-based active layer may output a current, which flows into a drain electrode, to a source electrode based on a gate-high voltage applied to the gate electrode.

Figure 21:
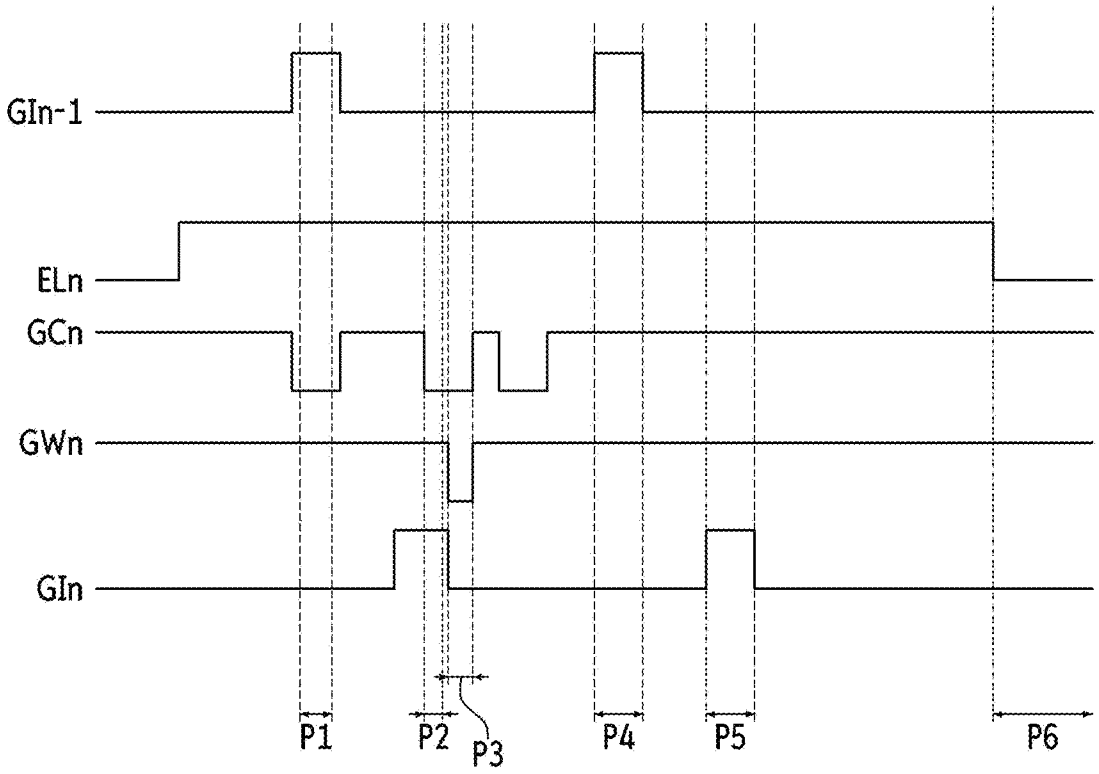
FIG. 21 is a timing diagram of a previous initialization gate signal, an emission signal, a compensation gate signal, a write gate signal, and an initialization gate signal of FIG. 20.

FIG. 21 is a timing diagram of a previous initialization gate signal, an emission signal, a compensation gate signal, a write gate signal, and an initialization gate signal of FIG. 20.

Specifically, FIG. 21 is a timing diagram of a previous $(n-1)^{th}$ initialization gate signal GIn−1, an $n^{th}$ emission signal ELn, an $n^{th}$ compensation gate signal GCn, an $n^{th}$ write gate signal GWn, and an $n^{th}$ initialization gate signal GIn illustrated in FIG. 20.

The gate driver 610 generates gate scan signals including the $n^{th}$ compensation gate signal GCn, the previous $(n-1)^{th}$ initialization gate signal GIn−1, and the $n^{th}$ initialization gate signal GIn based on the gate control signal GCS input from the timing controller 210.

The gate driver 610 sequentially generates the $n^{th}$ initialization gate signal GIn and the $n^{th}$ compensation gate signal GCn in response to the gate control signal GCS and outputs the $n^{th}$ initialization gate signal GIn and the $n^{th}$ compensation gate signal GCn to an $n^{th}$ initialization gate line SGLn and an $n^{th}$ compensation gate line GCLn, respectively.

The emission control driver 620 sequentially generates the $n^{th}$ emission signals ELn in response to the emission control signal ECS and outputs the $n^{th}$ emission signal ELn to each $n^{th}$ emission line EMLn. The emission control driver 620 generates emission scan signals including the $n^{th}$ write gate signal GWn and the $n^{th}$ emission signal ELn based on the emission control signal ECS input from the timing controller 210.

The $(n-1)^{th}$ initialization gate signal GIn−1 is generated at an active level during a first period P1 and a fourth period P4. The active level may refer to a voltage of a gate-on voltage magnitude that can turn on a corresponding transistor to which the signal is transmitted. In other words, a signal at the active level may have a greater or smaller value than a threshold voltage of a corresponding transistor. For example, when a corresponding transistor is an n-type transistor, the active level of a signal transmitted to a gate electrode of the corresponding transistor may refer to a high level (e.g., a positive level or a high voltage level). Accordingly, the n-type seventh and eighth transistors T7 and T8 are turned on in response to the previous $(n-1)^{th}$ initialization gate signal GIn−1 during the first period P1 and the fourth period P4.

The current $n^{th}$ initialization gate signal GIn is generated at an active level during a second period P2 and a fifth period P5. Accordingly, the n-type fourth transistor T4 is turned on in response to the current $n^{th}$ initialization gate signal GIn during the second period P2 and the fifth period P5.

According to the display device 10 according to the embodiment of the present disclosure described above, a control signal generation operation and a corresponding control signal input line needed for a hysteresis improvement operation and an initialization voltage input operation of the pixels PXn of each horizontal line are eliminated, and the previous $(n-1)^{th}$ initialization gate signal GIn−1 is used. That is, the pixels PXn of each horizontal line may perform the hysteresis improvement operation and the initialization voltage input operation in response to the previous $(n-1)^{th}$ initialization gate signal GIn−1. Accordingly, the number of lines connected to the pixels PXn of each horizontal line can be reduced. Because the number of control signal generation operations of the gate driver 610 and the number of corresponding control signal input lines are reduced, the circuit structure of the gate driver 610 can be simplified, and the size and placement area of the gate driver 610 can be reduced.

In concluding the detailed description, those skilled in the art will appreciate that many variations and modifications can be made to the embodiments without substantially departing from the principles and scope of the present disclosure. Therefore, the embodiments of the present disclosure are used in a generic and descriptive sense only and not for purposes of limitation.

What is claimed is:

1. A display device comprising:

a display panel in which a plurality of pixels are arranged in a display area to display an image; and a gate driver configured to supply gate scan signals to the pixels on a horizontal line-by-horizontal line basis, wherein from among the pixels, pixels that are on a same horizontal line along each gate line are configured to initialize a gate electrode, a first electrode, and a second electrode of a first transistor to an emission initialization voltage in response to a previous gate initialization signal supplied to pixels of a previous horizontal line and a current compensation gate signal from among the gate scan signals in a first period, to initialize the second electrode of the first transistor to an initialization voltage in response to a current gate initialization signal and the current compensation gate signal from among the gate scan signals in a second period, and to detect and compensate for a threshold voltage of the first transistor in response to the current compensation gate signal and a current write gate signal from among the gate scan signals in a third period, and wherein from among the pixels, the pixels that are on the same horizontal line along each gate line are configured to discharge a voltage of the second electrode of the first transistor and a voltage of an anode of a light emitting element to a magnitude of a common voltage in response to the previous gate initialization signal supplied to the pixels of the previous horizontal line in a fourth period, initialize a voltage of the first electrode of the first transistor and the voltage of the anode of the light emitting element to the emission initialization voltage in response to the current gate initialization signal from among the gate scan signals in a fifth period, and cause the light emitting element to emit light according to amount of driving current of the first transistor in response to a current emission signal from among the gate scan signals in a sixth period.

2. The display device of claim 1, wherein each of the pixels comprises:

the first transistor having the first electrode connected to a first node, the second electrode connected to a second node, and the gate electrode connected to a third node to control the amount of driving current of the light emitting element;

a second transistor having a first electrode connected to a data line, a second electrode connected to the first node, and a gate electrode connected to a write gate line;

a third transistor having a first electrode connected to the second node, a second electrode connected to the third node, and a gate electrode connected to a compensation gate line;

a fourth transistor having a first electrode connected to an initialization voltage line, a second electrode connected to the first electrode of the third transistor, and a gate electrode connected to a current initialization gate line;

a fifth transistor having a first electrode connected to a driving voltage line, a second electrode connected to the first node, and a gate electrode connected to an emission line;

a sixth transistor having a first electrode connected to the second node, a second electrode connected to the anode of the light emitting element, and a gate electrode connected to the emission line;

a seventh transistor having a first electrode connected to an emission initialization line, a second electrode connected to the first node, and a gate electrode connected to a previous initialization gate line connected to the pixels of the previous horizontal line; and an eighth transistor having a first electrode connected to the anode of the light emitting element, a second electrode connected to the emission initialization line, and a gate electrode connected to the previous initialization gate line.

3. The display device of claim 2, wherein all of the first through eighth transistors are p-type transistors, the first electrode is a source electrode, and the second electrode is a drain electrode.

4. The display device of claim 2, wherein the first through third transistors and the fifth and sixth transistors are p-type transistors, the first and second electrodes of the first through third transistors and the fifth and sixth transistors are source electrodes and drain electrodes, respectively, the fourth transistor, the seventh transistor and the eighth transistor are n-type transistors, and the first and second electrodes of the fourth transistor, the seventh transistor and the eighth transistor are drain electrodes and source electrodes, respectively.

5. The display device of claim 2, wherein the third transistor has a dual-gate transistor structure in which a (3-1)-th transistor and a (3-2)-th transistor are connected in parallel, the (3-1)-th transistor has a gate electrode connected to the compensation gate line, a first electrode connected to the second node and a second electrode connected to the third node, and the (3-2)-th transistor has a gate electrode connected to the compensation gate line, a first electrode connected to the second electrode of the fourth transistor and a second electrode connected to the second node and the second electrode of the (3-1)-th transistor.

6. The display device of claim 2, wherein the third transistor has a dual-gate transistor structure in which a (3-1)-th transistor and a (3-2)-th transistor are connected in parallel, the (3-1)-th transistor has a gate electrode connected to the compensation gate line, a first electrode connected to a second electrode of the (3-2)-th transistor and a second electrode connected to the third node, and the (3-2)-th transistor has a gate electrode connected to the compensation gate line, a first electrode connected to the second node and the second electrode of the fourth transistor and the second electrode connected to the first electrode of the (3-1)-th transistor.

7. The display device of claim 2, wherein the third transistor is has a triple-gate transistor structure in which a (3-1)-th transistor, a (3-2)-th transistor and a (3-3)-th transistor are connected in parallel, the (3-1)-th transistor has a gate electrode connected to the compensation gate line, a first electrode connected to a second electrode of the (3-2)-th transistor and a second electrode connected to the third node, the (3-2)-th transistor has a gate electrode connected to the compensation gate line, a first electrode connected to the second node and a second electrode of the (3-3)-th transistor and the second electrode connected to the first electrode of the (3-1)-th transistor, and the (3-3)-th transistor has a gate electrode connected to the compensation gate line, a first electrode connected to the second electrode of the fourth transistor and the second electrode connected to the second node and the first electrode of the (3-2)-th transistor.

8. The display device of claim 2, wherein for pixels that are on a first horizontal line, the gate driver is configured to generate a compensation gate signal at an active level and to transmit the compensation gate signal to the compensation gate line in the first period of a driving period of the pixels on the same horizontal line and to generate a bias control signal at an active level and to supply the bias control signal to the gate electrodes of the seventh and eighth transistors in a same period as the compensation gate signal.

9. The display device of claim 8, wherein for pixels that are on horizontal lines after the first horizontal line, the gate driver is configured to generate the compensation gate signal at an active level and to transmit the compensation gate signal to the compensation gate line during a period overlapping the previous gate initialization signal supplied to the pixels of the previous horizontal line or the bias control signal in the first period of the driving period of the pixels on the same horizontal line, to generate an initialization gate signal and a compensation gate signal at an active level and to transmit the initialization gate signal and the compensation gate signal to the current initialization gate line and the compensation gate line, respectively, in the second period, to generate a compensation gate signal and a write gate signal at an active level and to transmit the compensation gate signal and the write gate signal to the compensation gate line and the write gate line, respectively, in the third period, to generate the previous initialization gate signal, which is supplied to the pixels of the previous horizontal line, at an active level and to transmit the previous initialization gate signal to the previous initialization gate line in the fourth period, to generate a current initialization gate signal at an active level and to transmit the current initialization gate signal to the current initialization gate line in the fifth period, and to generate an emission signal at an active level and to transmit the emission signal to the emission line in the sixth period.

10. An electronic device comprising a display device configured to display an image, wherein the display device comprises:

a display panel in which a plurality of pixels are arranged in a display area to display an image; and a gate driver configured to supply gate scan signals to the pixels on a horizontal line-by-horizontal line basis, wherein from among the pixels, pixels that are on a same horizontal line along each gate line are configured to initialize a gate electrode, a first electrode and a second electrode of a first transistor to an emission initialization voltage in response to a previous gate initialization signal supplied to pixels of a previous horizontal line and a current compensation gate signal from among the gate scan signals in a first period, to initialize the second electrode of the first transistor to an initialization voltage in response to a current gate initialization signal and the current compensation gate signal from among the gate scan signals in a second period, and to detect and compensate for a threshold voltage of the first transistor in response to the current compensation gate signal and a current write gate signal from among the gate scan signals in a third period, and wherein from among the pixels, the pixels that are on the same horizontal line along each gate line are configured to discharge a voltage of the second electrode of the first transistor and a voltage of an anode of a light emitting element to a magnitude of a common voltage in response to the previous gate initialization signal supplied to the pixels of the previous horizontal line in a fourth period, to initialize a voltage of the first electrode of the first transistor and the voltage of the anode of the light emitting element to the emission initialization voltage in response to the current gate initialization signal from among the gate scan signals in a fifth period, and to cause the light emitting element to emit light according to amount of driving current of the first transistor in response to a current emission signal from among the gate scan signals in a sixth period.

11. The electronic device of claim 10, wherein each of the pixels comprises:

the first transistor having the first electrode connected to a first node, the second electrode connected to a second node, and the gate electrode connected to a third node to control the amount of driving current of the light emitting element;

a second transistor having a first electrode connected to a data line, a second electrode connected to the first node, and a gate electrode connected to a write gate line;

a third transistor having a first electrode connected to the second node, a second electrode connected to the third node, and a gate electrode connected to a compensation gate line;

a fourth transistor having a first electrode connected to an initialization voltage line, a second electrode connected to the first electrode of the third transistor, and a gate electrode connected to a current initialization gate line;

a fifth transistor having a first electrode connected to a driving voltage line, a second electrode connected to the first node, and a gate electrode connected to an emission line;

a sixth transistor having a first electrode connected to the second node, a second electrode connected to the anode of the light emitting element, and a gate electrode connected to the emission line;

a seventh transistor having a first electrode connected to an emission initialization line, a second electrode connected to the first node, and a gate electrode connected to a previous initialization gate line connected to the pixels of the previous horizontal line; and an eighth transistor having a first electrode connected to the anode of the light emitting element, a second electrode connected to the emission initialization line, and a gate electrode connected to the previous initialization gate line.

12. The electronic device of claim 11, wherein the first through eighth transistors are p-type transistors, the first electrode is a source electrode, and the second electrode is a drain electrode.

13. The electronic device of claim 11, wherein the first through third transistors and the fifth and sixth transistors are p-type transistors, the first and second electrodes of the first through third transistors and the fifth and sixth transistors are source electrodes and drain electrodes, respectively, the fourth transistor, the seventh transistor and the eighth transistor are n-type transistors, and the first and second electrodes of the fourth transistor, the seventh transistor and the eighth transistor are drain electrodes and source electrodes, respectively.

14. The electronic device of claim 11, wherein the third transistor has a dual-gate transistor structure in which a (3-1)-th transistor and a (3-2)-th transistor are connected in parallel, the (3-1)-th transistor has a gate electrode connected to the compensation gate line, a first electrode connected to the second node and a second electrode connected to the third node, and the (3-2)-th transistor has a gate electrode connected to the compensation gate line, a first electrode connected to the second electrode of the fourth transistor and a second electrode connected to the second node and the second electrode of the (3-1)-th transistor.

15. The electronic device of claim 11, wherein the third transistor has a dual-gate transistor structure in which a (3-1)-th transistor and a (3-2)-th transistor are connected in parallel, the (3-1)-th transistor has a gate electrode connected to the compensation gate line, a first electrode connected to a second electrode of the (3-2)-th transistor and a second electrode connected to the third node, and the (3-2)-th transistor has a gate electrode connected to the compensation gate line, a first electrode connected to the second node and the second electrode of the fourth transistor and the second electrode connected to the first electrode of the (3-1)-th transistor.

16. The electronic device of claim 11, wherein the third transistor has a triple-gate transistor structure in which a (3-1)-th transistor, a (3-2)-th transistor and a (3-3)-th transistor are connected in parallel, the (3-1)-th transistor has a gate electrode connected to the compensation gate line, a first electrode connected to a second electrode of the (3-2)-th transistor and a second electrode connected to the third node, the (3-2)-th transistor has a gate electrode connected to the compensation gate line, a first electrode connected to the second node and a second electrode of the (3-3)th transistor and the second electrode connected to the first electrode of the (3-1)-th transistor, and the (3-3)-th transistor has a gate electrode connected to the compensation gate line, a first electrode connected to the second electrode of the fourth transistor and the second electrode connected to the second node and the first electrode of the (3-2)-th transistor.

17. The electronic device of claim 11, wherein for pixels that are on a first horizontal line, the gate driver configured to generate a compensation gate signal at an active level and configured to transmit the compensation gate signal to the compensation gate line in the first period of a driving period of the pixels on the same horizontal line and generates a bias control signal at an active level and configured to supply the bias control signal to the gate electrodes of the seventh and eighth transistors in the same period as the compensation gate signal.

18. The electronic device of claim 17, wherein for pixels on horizontal lines after the first horizontal line, the gate driver is configured to generate the compensation gate signal at an active level and to transmit the compensation gate signal to the compensation gate line during a period overlapping the previous gate initialization signal supplied to the pixels of the previous horizontal line or the bias control signal in the first period of the driving period of the pixels at the same horizontal line, to generate an initialization gate signal and a compensation gate signal at an active level and to transmit the initialization gate signal and the compensation gate signal to the current initialization gate line and the compensation gate line, respectively, in the second period, to generate a compensation gate signal and a write gate signal at an active level and to transmit the compensation gate signal and the write gate signal to the compensation gate line and the write gate line, respectively, in the third period, to generate the previous initialization gate signal, which is supplied to the pixels of the previous horizontal line, at an active level and to transmit the previous initialization gate signal to the previous initialization gate line in the fourth period, to generate a current initialization gate signal at an active level and to transmit the current initialization gate signal to the current initialization gate line in the fifth period, and to generate an emission signal at an active level and to transmit the emission signal to the emission line in the sixth period.

* * * * *